United States Patent
Rofougaran et al.

(10) Patent No.: US 7,933,562 B2
(45) Date of Patent: Apr. 26, 2011

(54) RF TRANSCEIVER WITH ADJUSTABLE ANTENNA ASSEMBLY

(75) Inventors: Ahmadreza Reza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 972 days.

(21) Appl. No.: 11/801,940

(22) Filed: May 11, 2007

(65) Prior Publication Data

US 2008/0280571 A1    Nov. 13, 2008

(51) Int. Cl.
*H04B 1/46* (2006.01)

(52) U.S. Cl. ........... 455/80; 455/78; 455/79; 455/82; 455/83; 455/552.1; 455/553.1; 455/121; 455/123; 455/124; 455/125; 455/280; 455/281; 455/334; 343/820; 343/822; 343/850; 343/852; 343/860; 343/861

(58) Field of Classification Search ........... 455/78–83, 455/552.1, 553.1, 561, 562.1, 101, 121, 123–125, 455/193.1–193.3, 280–282, 334; 343/820–823, 343/850–853, 860–861; 375/219
See application file for complete search history.

(56) References Cited

U.S. PATENT DOCUMENTS

| | | | | |
|---|---|---|---|---|
| 5,564,086 A * | 10/1996 | Cygan et al. | ............... | 455/126 |
| 5,778,308 A * | 7/1998 | Sroka et al. | ............... | 455/115.1 |
| 6,845,126 B2 * | 1/2005 | Dent et al. | ............... | 375/219 |
| 6,961,368 B2 * | 11/2005 | Dent et al. | ............... | 375/219 |
| 7,212,788 B2 * | 5/2007 | Weber et al. | ............... | 455/78 |
| 7,454,227 B2 * | 11/2008 | Kitaji | ............... | 455/522 |
| 7,463,673 B2 * | 12/2008 | Fujii et al. | ............... | 375/211 |
| 7,496,384 B2 * | 2/2009 | Seto et al. | ............... | 455/562.1 |
| 7,525,493 B2 * | 4/2009 | Iwai et al. | ............... | 343/702 |
| 7,545,778 B2 * | 6/2009 | Sugar et al. | ............... | 370/335 |
| 7,599,672 B2 * | 10/2009 | Shoji et al. | ............... | 455/137 |
| 7,630,690 B2 * | 12/2009 | Kaewell et al. | ............... | 370/335 |
| 7,664,533 B2 * | 2/2010 | Logothetis et al. | ............... | 455/562.1 |
| 2008/0280574 A1 | 11/2008 | Rofougaran | | |
| 2008/0280581 A1 | 11/2008 | Rofougaran | | |

* cited by examiner

*Primary Examiner* — Tuan A Tran
(74) *Attorney, Agent, or Firm* — Garlick Harrison & Markison; Timothy W. Markison

(57) ABSTRACT

A radio frequency (RF) transceiver includes a baseband processing module, a configurable receiver section, a configurable transmitter section and a configurable antenna assembly. The baseband processing module converts outbound data into an outbound symbol stream, converts an inbound symbol stream into inbound data and generates a transmit adjust signal and a receive adjust signal. The receiver section converts an inbound RF signal into the inbound symbol stream. The transmitter section converts the outbound symbol stream into an outbound RF signal. The antenna assembly receives the inbound RF signal via a first antenna structure and transmits the outbound RF signal via a second antenna structure. The first antenna structure and/or the configurable receiver section adjusts phase and/or amplitude of the inbound RF signal in accordance with the receive adjust signal. The second antenna structure and/or the configurable transmitter section adjusts phase and/or amplitude of the outbound RF signal in accordance with the transmit adjust signal.

18 Claims, 26 Drawing Sheets

RF TRANSCEIVER WITH ADJUSTABLE ANTENNA ASSEMBLY

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to antennas used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Since the wireless part of a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, the same polarization, different polarization, and/or any number of other electro-magnetic properties.

One popular antenna structure for RF transceivers is a three-dimensional in-air helix antenna, which resembles an expanded spring. The in-air helix antenna provides a magnetic omni-directional mono pole antenna, but occupies a significant amount of space and its three dimensional aspects cannot be implemented on a planer substrate, such as a printed circuit board (PCB).

For PCB implemented antennas, the antenna has a meandering pattern on one surface of the PCB. Such an antenna consumes a relatively large area of the PCB. For example, a ¼ wavelength antenna at 900 MHz has a total length of approximately 8 centimeters (i.e., 0.25*32 cm, which is approximate wavelenght of a 900 MHz signal). As another example, a ¼ wavelength antenna at 2400 MHz has a total length of approximately 3 cm (i.e., 0.25*12.5 cm, which is the approximate wavelength of a 2400 MH signal). Even with a tight meandering pattern, a single 900 MHz antenna consumes approximately 4 $cm^2$.

If the RF transceiver is a multiple band transceiver (e.g., 900 MHz and 2400 MHz), provides beamforming, provides polarization, provides diversity, and/or provides multiple in-band communications, then two antennas are needed, which consumes even more PCB space. In addition, due to multiple path fading, the received signals have distortion (e.g., amplitude error and/or phase error) with respect to the transmitted signals. There are many solutions to overcome this problem once the received RF signals are converted to baseband, however, there are few, if any, solutions to correct this problem in RF.

Therefore, a need exists for an antenna assembly and applications thereof that overcomes at least some of the above mentioned limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
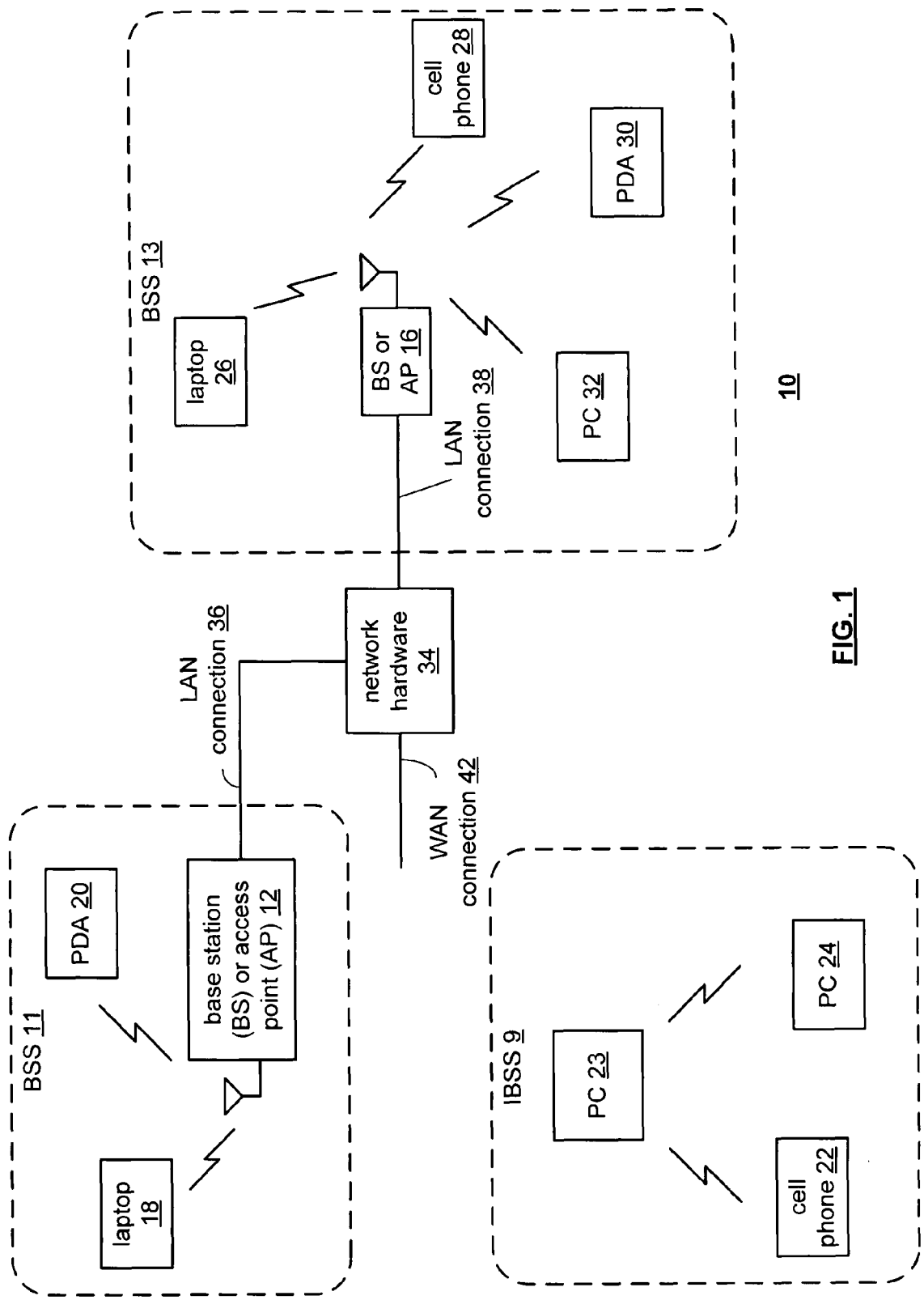
FIG. 1 is a schematic block diagram of an embodiment of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28 that include a wireless RF transceiver.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, RFID, and/or any other type of radio frequency based network protocol). Regardless of the particular type of communication system, each wireless communication device includes a built-in RF transceiver and/or is coupled to an RF transceiver. Note that one or more of the wireless communication devices may include an RFID reader and/or an RFID tag.

Figure 2:
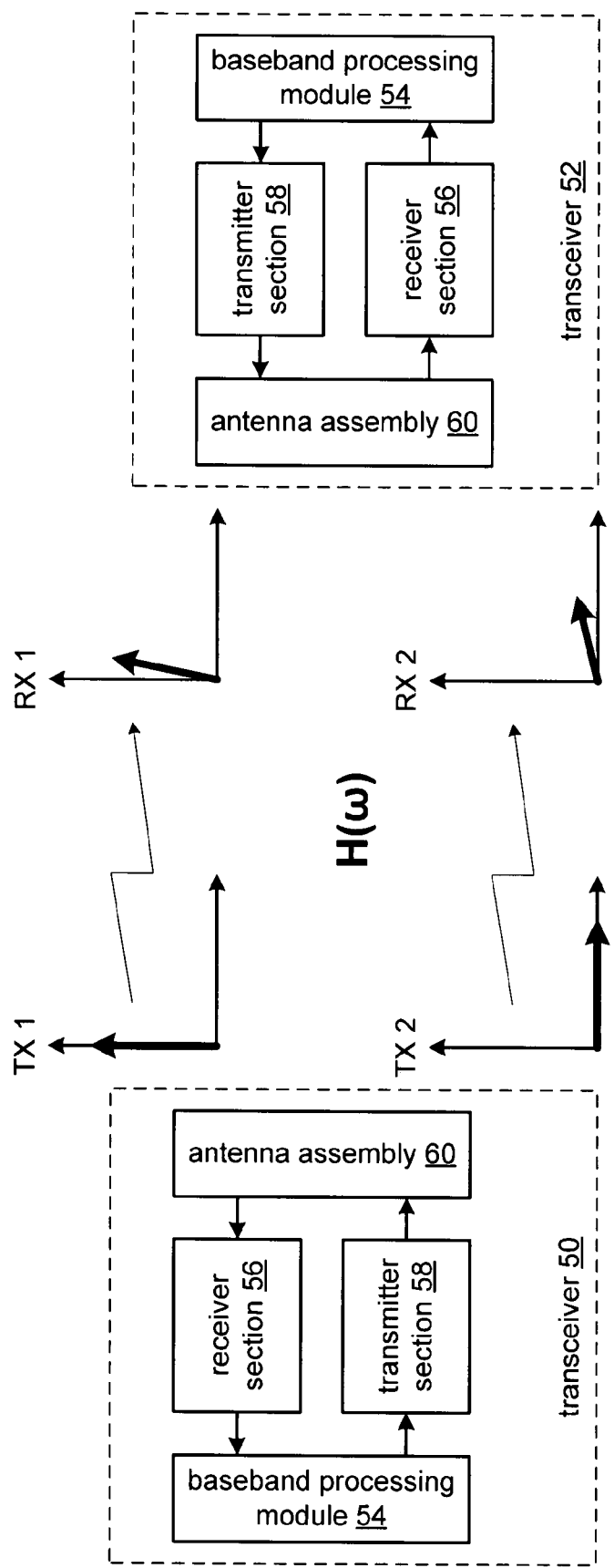
FIG. 2 is a schematic block diagram of an example of a communication between two RF transceivers in accordance with the present invention.

FIG. 2 is a schematic block diagram of an example of a communication between two RF transceivers 50 and 52, each of which includes a baseband processing module 54, a receiver section 56, a transmitter section 58, and an antenna assembly 60. The RF transceivers 50 and 52 communicate via one or more RF channels in accordance with one or more wireless communication standards, which includes, but is not limited to, RFID, IEEE 802.11, Bluetooth, AMPS, digital AMPS, GSM, CDMA, wide bandwidth CDMA (WCMDA), LMDS, MMDS, high-speed downlink packet access (HSDPA), high-speed uplink packet access (HSUPA), Enhanced Data rates for GSM Evolution (EDGE), General Packet Radio Service (GPRS), and/or variations thereof.

The one or more channels supporting the communication have a channel response $H(\omega)$, which distorts the transmitted signals. For example, a first outbound RF signal may be transmitted by a first antenna (TX 1) and a second outbound RF signal may be transmitted by a second antenna (TX 2). In this example, the first and second outbound RF signals are represented as vectors having an amplitude [A(t)] component and a phase [$\Phi(t)$] component (which is shown as 0° with respect to the polarization of the antennas). For instance, the first outbound RF signal may be expressed as $A(t)\cos[\omega_{RF1}(t)+\omega_D(t)+\Phi(t)]$ and the second outbound RF signal may be expressed as $A(t)\cos[\omega_{RF1}(t)+\omega_D(t)+\Phi(t)+90°]$ or as $A(t)\sin[\omega_{RF1}(t)+\omega_D(t)+\Phi(t)]$, where A(t) represents the amplitude information (e.g., a constant amplitude, amplitude modulation, and/or amplitude shift keying), the $\omega_{RF1}(t)$ represents the RF carrier frequency, the $\omega_D(t)$ represents the sub-carrier frequency of the data, and the $\Phi(t)$ represents phase information (e.g., a constant phase, phase modulation, and/or phase shift keying). In an alternate embodiment, the $\Phi(t)$ may be replaced with frequency information (e.g., frequency modulation, frequency shift keying, etc.).

When the first and second outbound RF signals are received by the second RF transceiver 52, the vectors are distorted (e.g., have an amplitude error and/or a phase error). In this example, both the phase and amplitude are distorted for each signal. For instance, the first inbound, or received, RF signal may be expressed as $A'(t)\cos[\omega_{RF1}(t)+\omega_D(t)+\Phi'(t)]$ and the second outbound RF signal may be expressed as $A'(t)\cos[\omega_{RF1}(t)+\omega_D(t)+\Phi'(t)+90°]$ or as $A'(t)\sin[\omega_{RF1}(t)+\omega_D(t)+\Phi'(t)]$, where A'(t) represents the received amplitude information (e.g., a constant amplitude, amplitude modulation, and/or amplitude shift keying), the $\omega_{RF1}(t)$ represents the RF carrier frequency, the $\omega_D(t)$ represents the sub-carrier frequency of the data, and the $\Phi'(t)$ represents the received phase information (e.g., a constant phase, phase modulation, and/or phase shift keying). As will be described below, the antenna assembly 60, the receiver section 56, and/or the transmitter section 58 provide error correction to reduce the distortion of the received, or inbound, RF signals thereby improving quality of the communication.

The first and second RF signals may be representative of a variety of wireless communication protocols. For example, the first and second RF signals may be part, or all of, the transmitted signals in a multiple input multiple output (MIMO) communication. As another example, the first and second RF signals may be the same signal offset by an orthogonal relationship of the antennas or an induced orthogonal phase offset to provide in-air beamforming. As yet another example, the first and second RF signals may be different signals conveying different data using the orthogonal polarization of the antennas to provide isolation between the two signals. As a further example, the first and second RF signals may be the same signal transmitted simultaneously for redundancy and/or for increased transmit power. Note that while the first and second RF signals are shown as orthogonal signals with respect to each other, they may be of the same polarization, of the same phase offset, of different phase offsets, and/or a combination thereof. Further note that in this example, the transceivers 50 and 52 are communicating in a half duplex mode such that one of the transceivers 50 and 52 is transmitting and the other is receiving and then they switch such that the other is transmitting and the first one is receiving.

Figure 3:
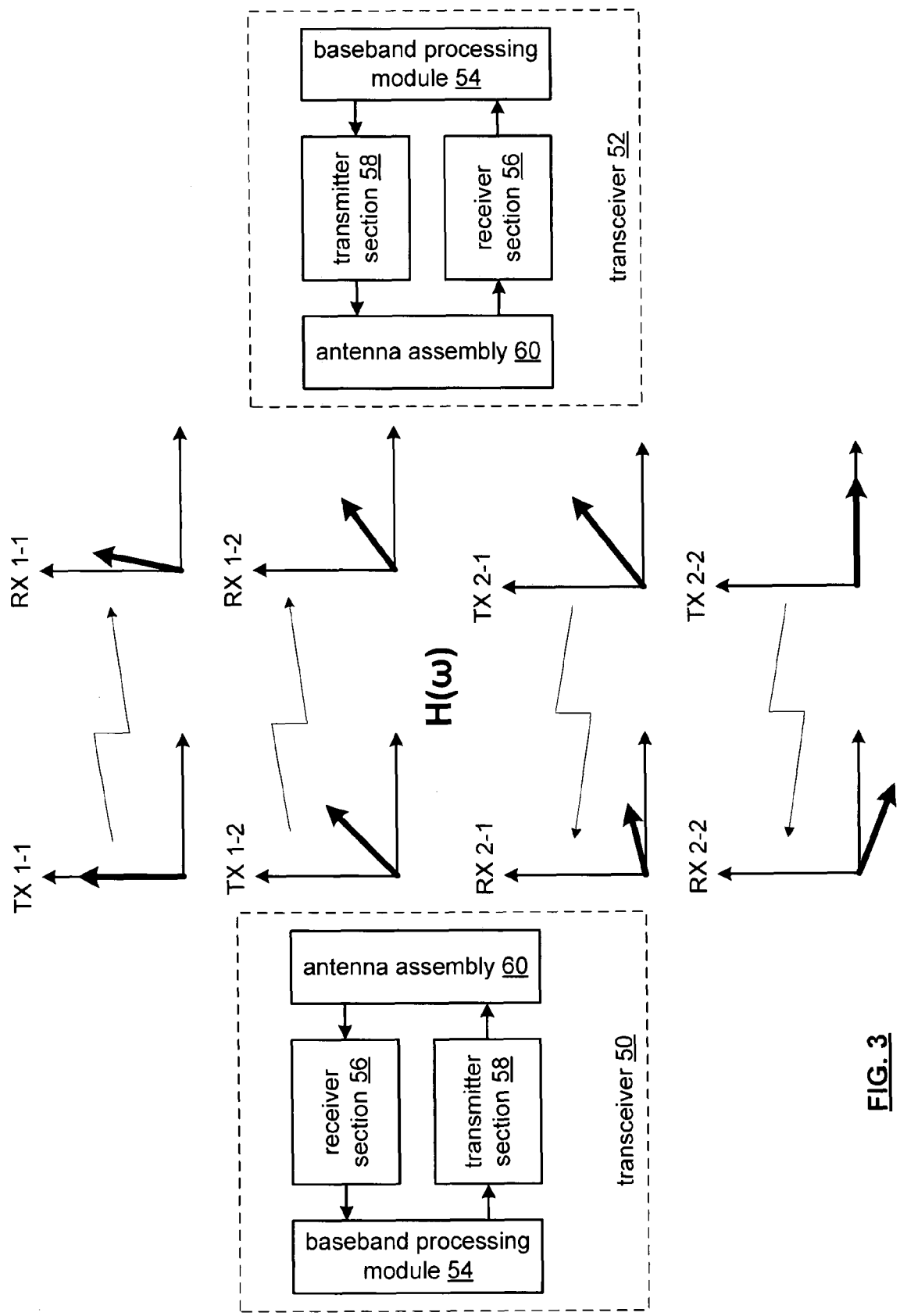
FIG. 3 is a schematic block diagram of another example of a communication between two RF transceivers in accordance with the present invention.

FIG. 3 is a schematic block diagram of another example of a communication between two RF transceivers 50 and 52, each of which includes the baseband processing module 54, the receiver section 56, the transmitter section 58, and the antenna assembly 60. The RF transceivers 50 and 52 communicate via one or more up link (e.g., from transceiver 50 to transceiver 52) RF channels and via one or more down link (e.g., from transceiver 52 to transceiver 50) in accordance with one or more wireless communication standards, which includes, but is not limited to, RFID, IEEE 802.11, Bluetooth, AMPS, digital AMPS, GSM, CDMA, wide bandwidth CDMA (WCMDA), LMDS, MMDS, high-speed downlink packet access (HSDPA), high-speed uplink packet access (HSUPA), Enhanced Data rates for GSM Evolution (EDGE), General Packet Radio Service (GPRS), and/or variations thereof.

The one or more up link and down link channels supporting the communication have a channel response $H(\omega)$, which distorts the transmitted signals. For example, a first outbound RF signal may be transmitted by a first antenna (TX 1-1) and a second outbound RF signal may be transmitted by a second antenna (TX 1-2) of transceiver 50 and a third outbound RF signal may be transmitted by a first antenna (TX 2-1) and a fourth outbound RF signal may be transmitted by a second antenna (TX 2-2) of transceiver 52. In this example, the first through the fourth outbound RF signals are represented as vectors having an amplitude [A(t)] component and a phase [$\Phi(t)$] component (which may be mathematically expressed as previously described with reference to FIG. 2).

When the first and second outbound RF signals are received by the second RF transceiver 52, the vectors are distorted and when the third and fourth outbound RF signals are received by transceiver 50, the vectors are also distorted. In this example, both the phase and amplitude are distorted for each signal. As will be described below, the antenna assembly 60, the receiver section 56, and/or the transmitter section 58 provide error correction to reduce the distortion of the received, or inbound, RF signals thereby improving quality of the communication.

The first through fourth RF signals may be representative of a variety of wireless communication protocols. For example, the first through fourth RF signals may be part, or all of, the transmitted signals in a multiple input multiple output (MIMO) communication. As another example, the first through fourth RF signals may be the same signal offset by an orthogonal relationship of the antennas or an induced orthogonal phase offset to provide in-air beamforming. As yet another example, the first through fourth RF signals may be different signals conveying different data using the orthogonal polarization of the antennas to provide isolation between the signals. As a further example, the first and second RF signals may be the same signal and the third and fourth RF signals may be the same signal that are transmitted simultaneously for redundancy and/or for increased transmit power. Note that while the first and second RF signals and the third and fourth RF signals are shown as orthogonal signals with respect to each other, they may be of the same polarization, of the same phase offset, of different phase offsets, and/or a combination thereof. Further note that in this example, the transceivers 50 and 52 are communicating in a full duplex mode such that the transceivers 50 and 52 are capable of transmitting and receiving at the same time.

Figure 4:
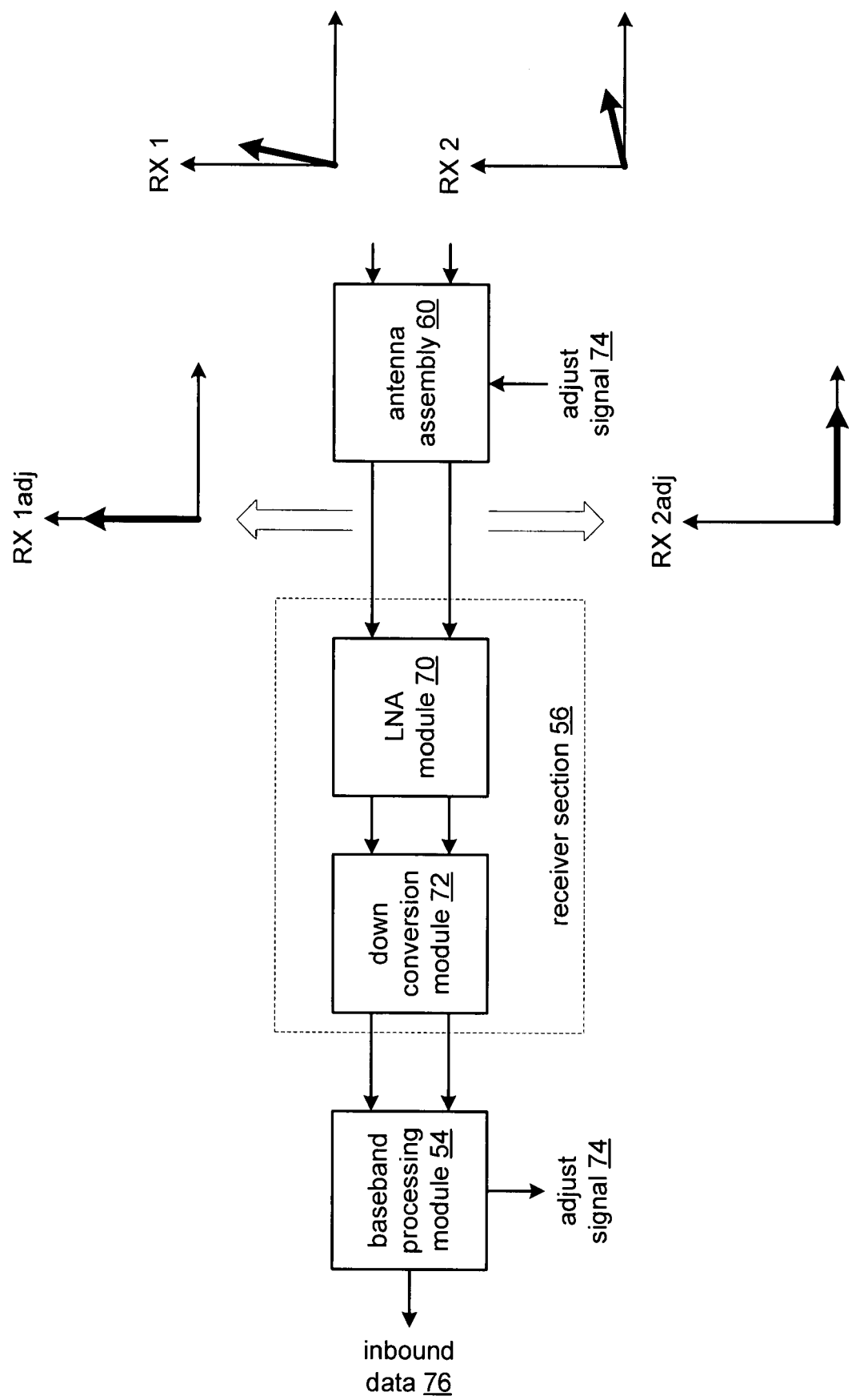
FIG. 4 is a schematic block diagram of an embodiment of an RF receiver in accordance with the present invention.

FIG. 4 is a schematic block diagram of an embodiment of an RF receiver that includes the antenna assembly 60, the receiver section 56, and the baseband processing module 54. The receiver section 56 includes a low noise amplifier (LNA) module 70 and a down conversion module 72.

In this embodiment, the antenna assembly 60 receives an inbound RF signal that includes a first signal component (RX 1) and a second signal component (RX 2). The first and second signal components RX 1 and RX 2 will have some distortion (e.g., amplitude and/or phase error) due to the channel. The antenna assembly 60 adjusts amplitude and/or phase of the first and/or second signal components RX 1 and RX 2 to reduce and/or substantially eliminate the distortion based on an adjust signal 74. The antenna assembly 60 provides the adjusted inbound RF signal (e.g., RX 1*adj* and RX 2*adj*) to the receiver section 56.

The low noise amplifier (LNA) module 70, which includes one or more low noise amplifiers coupled in series and/or in parallel, amplifies the adjusted inbound RF signal (e.g., RX 1*adj* and RX 2*adj*) to produce an amplified inbound RF signal. The down conversion module 72 converts the amplified inbound RF signal into a first inbound symbol stream corresponding to the first signal component (e.g., RX 1*adj*) and into a second inbound symbol stream corresponding to the second signal component (e.g., RX 2*adj*). In an embodiment of the down conversion module 72, it mixes in-phase (I) and quadrature (Q) components of the amplified inbound RF signal (e.g., amplified RX 1*adj* and RX 2*adj*) with in-phase and quadrature components of receiver local oscillation to produce a mixed I signal and a mixed Q signal for each component of the amplified inbound RF signal. Each pair of the mixed I and Q signals are combined to produce the first and second inbound symbol streams. In this embodiment, each of the first and second inbound symbol streams includes phase information (e.g., +/−Δθ[phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound RF signals RX 1 and RX 2 include amplitude information (e.g., +/−ΔA [amplitude shift] and/or A(t) [amplitude modulation]). To recover the amplitude information, the down conversion module 72 further includes an amplitude detector such as an envelope detector, a low pass filter, etc.

The baseband processing module 54 converts the first and second inbound symbol streams into inbound data in accordance with one or more wireless communication standards such as such as RFID, IEEE 802.11, Bluetooth, AMPS, digital AMPS, GSM, CDMA, wide bandwidth CDMA (WCMDA), LMDS, MMDS, high-speed downlink packet access (HSDPA), high-speed uplink packet access (HSUPA), Enhanced Data rates for GSM Evolution (EDGE), General Packet Radio Service (GPRS), and/or variations thereof. In addition, the baseband processing module 54 generates the adjust signal 74. Note that the baseband processing module 54 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 2-26.

While the embodiment of FIG. 4 shows two inbound paths producing the inbound data 74, it should be understood that the receiver may include more than two inbound paths to produce the inbound data. It should be further understood that the inbound data 74 may be one stream of data or a plurality of different streams of data, where the data is one of voice signals, audio files, text messages, video files, image files, and/or video graphics.

To facilitate the generating the adjust signal 74, the receiver may perform a training sequence. In this training sequence, the antenna assembly 60 receives an inbound RF training signal that includes a first training signal component and a second training signal component. When the inbound RF training signal was transmitted, the amplitude and phase of the first and second training signal components were known. For example, the RF training signal may correspond to the signal detection portion of a packet or frame (e.g., the short and/or long training sequence of an IEEE 802.11 frame).

The low noise amplifier module 70 amplifies the inbound RF training signal to produce an amplified inbound RF training signal. The down conversion module 72 converts the amplified inbound RF training signal into a first inbound training symbol stream corresponding to the first training signal component and into a second inbound training symbol stream corresponding to the second training signal component.

The baseband processing module 54 compares the first and second inbound training symbol streams with expected first and second inbound training symbol streams and, when the first and second inbound training symbol streams compares unfavorably with expected first and second inbound training symbol streams, generating the adjust signal. For example, if the phase and/or amplitude of the received signals is not as expected, the baseband processing module 54 determines the level of error and generates the adjust signal 74 based on this determination. In an alternate embodiment, the baseband processing module 54 may use a received signal strength indication of each inbound RF training signal component to determine the phase and/or amplitude error. For example, assume the RF training signal is constant amplitude cosine signal with a 45° beamforming coefficient: $A^*\cos(\omega_{RF}(t)+45)$. In this example, two orthogonal antennas should receive equal representations of the cosine signal [e.g., $1.414A^*\cos(\omega_{RF}(t))$], where 1.414 is the square root of 2, if there is no distortion. If there is distortion, the orthogonal antennas will not receive equal representations of the cosine signal, where the unequal representations may be used to determine the phase error and/or the amplitude error. Note that the baseband processing module 54 may update the adjust signal 74 on a frame-by-frame basis, a communication-by-communication basis, and/or at any other desired interval.

Figure 5:
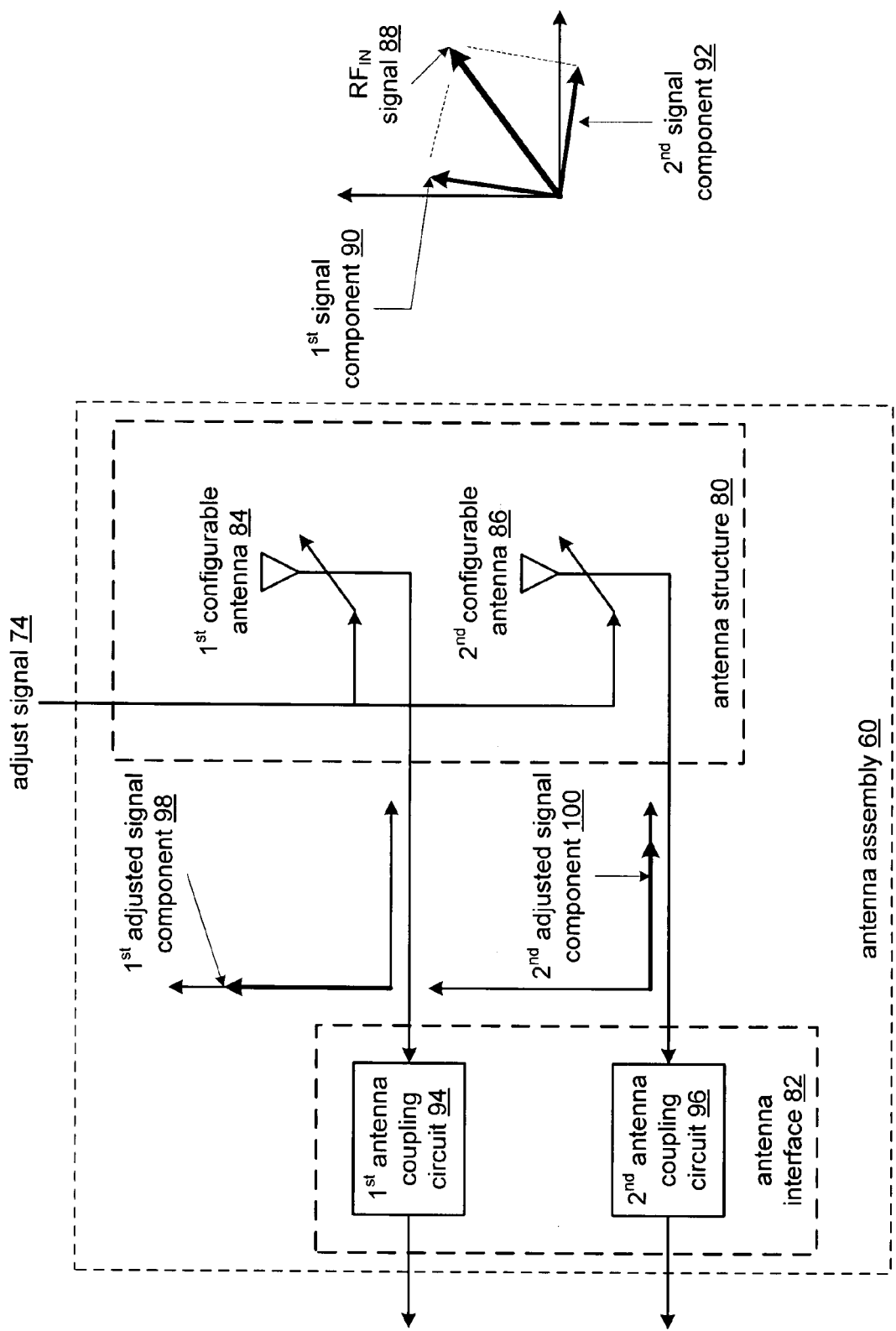
FIG. 5 is a schematic block diagram of an embodiment of an antenna assembly in accordance with the present invention.

FIG. 5 is a schematic block diagram of an embodiment of an antenna assembly 60 that includes an antenna structure 80 and an antenna interface 82. The antenna structure 80 includes a first configurable antenna 84 and a second configurable antenna 86. The antenna interface 82 includes a first antenna coupling circuit 94 and a second antenna coupling circuit 96.

In this embodiment, the first configurable antenna 84 receives the first signal component 90 of the inbound RF signal 88 and the second configurable antenna 86 receives the second signal component 92 of the inbound RF signal 88. As shown, the inbound RF signal 88 is a vector having an amplitude and a phase with respect to first and second axis and is the sum of the first and second signal components 90 and 92. Note that in this illustration, the first and second signal components 90 and 92 are shown as effective signal components to illustrate the distortion.

To compensate the distortion, the first configurable antenna 84 adjusts the amplitude and/or phase of the first signal component 90 in accordance with the adjust signal 74 and the second configurable antenna 86 adjusts the amplitude and/or phase of the second signal component 92 in accordance with the adjust signal 74. The adjustment of the first and/or second configurable antennas 84 and 86 may be done by adjusting an antenna characteristic, which includes, but is not limited to, antenna bandwidth, antenna quality factor (Q), inductance, resistance, frequency bandpass, gain, capacitance, center frequency, and/or effective wavelength.

As such, by adjusting an antenna characteristic of the first configurable antenna 84, it adjusts the amplitude and/or frequency of the first signal component 90 to produce a first adjusted signal component 98. Similarly, by adjusting an antenna characteristic of the second configurable antenna 86, it adjusts the amplitude and/or frequency of the second signal component 92 to produce a second adjusted signal component 100. Thus, the first and second adjusted signal components 98 and 100 more closely resemble the pre-distorted first and second signal components of an RF signal.

The first antenna coupling circuit, which may include a transformer balun, an impedance matching circuit, a bandpass filter, and/or a transmission line, couples the first configurable antenna 84 to the low noise amplifier module 70. The second antenna coupling circuit 96, which may include a transformer balun, an impedance matching circuit, a bandpass filter, and/or a transmission line, couples the second configurable antenna 86 to the low noise amplifier module 70. In one embodiment, the low noise amplifier module 70 includes a first low noise amplifier and a second low noise amplifier, where the first low noise amplifier receivers the first adjusted signal component 98 and the second low noise amplifier receives the second adjusted signal component 100.

Figure 6:
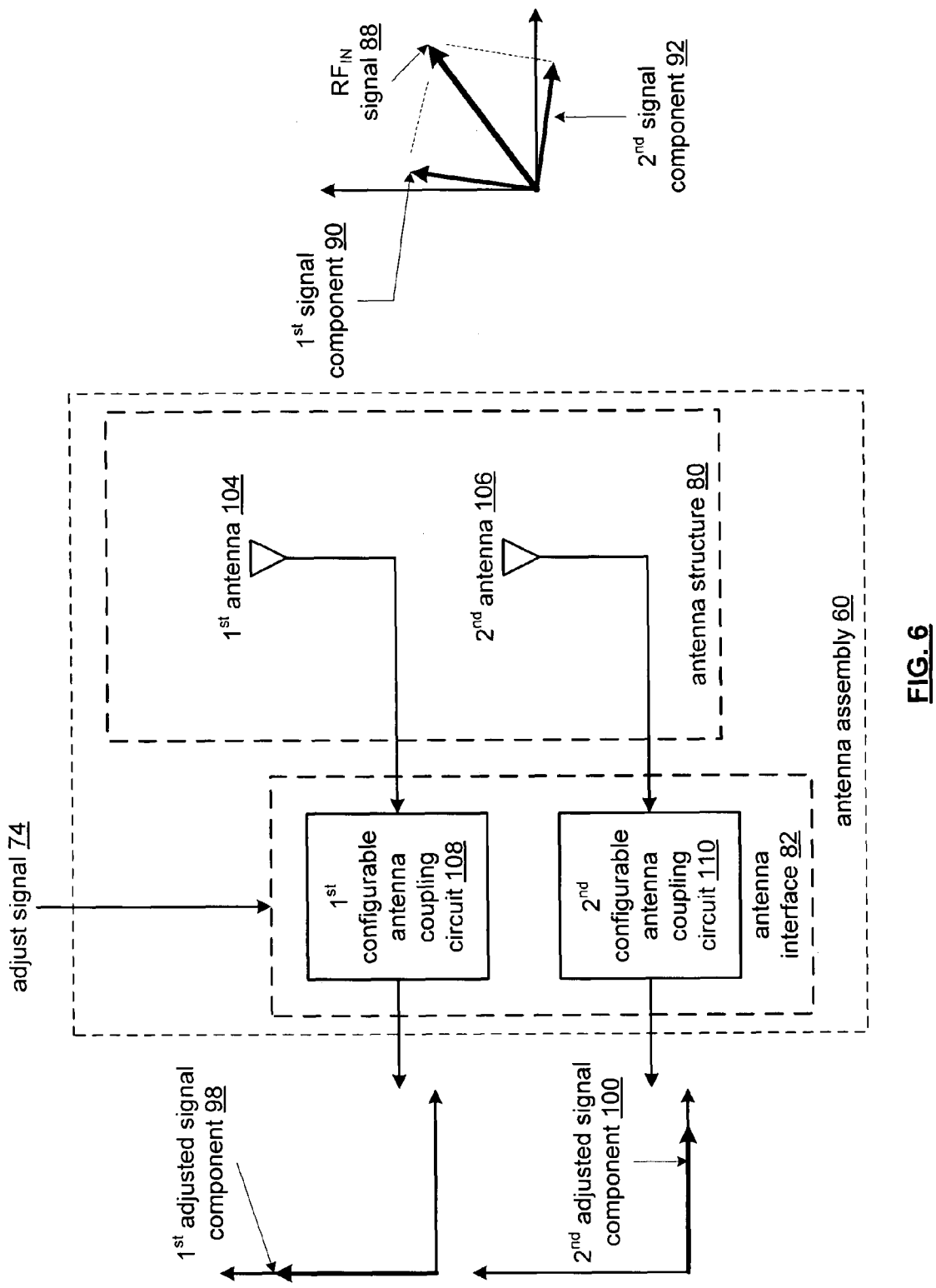
FIG. 6 is a schematic block diagram of another embodiment of an antenna assembly in accordance with the present invention.

FIG. 6 is a schematic block diagram of another embodiment of an antenna assembly 60 that includes an antenna structure 80 and an antenna interface 82. The antenna structure 80 includes a first antenna 104 and a second antenna 106. The antenna interface 82 includes a first configurable antenna coupling circuit 108 and a second configurable antenna coupling circuit 110.

In this embodiment, the first antenna 104 receives the first signal component 90 of the inbound RF signal 88 and the second antenna 106 receives the second signal component 92 of the inbound RF signal 88. As shown, the inbound RF signal 88 is a vector having an amplitude and a phase with respect to first and second axis and is the sum of the first and second signal components 90 and 92. Note that in this illustration, the first and second signal components 90 and 92 are shown as effective signal components to illustrate the distortion.

The first and second antennas 104 and 106 provide the first and second signal components 90 and 92 to the first and second configurable antenna coupling circuits 108 and 110. To compensate the distortion, the first configurable antenna interface 108, which may include a transformer balun, an adjustable impedance matching circuit, an adjustable bandpass filter, and/or a transmission line, adjusts the amplitude and/or phase of the first signal component 90 in accordance with the adjust signal 74. The second configurable antenna interface 110, which may include a transformer balun, an adjustable impedance matching circuit, an adjustable bandpass filter, and/or a transmission line, adjusts the amplitude and/or phase of the second signal component 92 in accordance with the adjust signal 74. The adjustment of the first and/or second configurable antenna interfaces 108 and 110 may be done by adjusting an antenna interface characteristic, which includes, but is not limited to, bandwidth, quality factor (Q), inductance, resistance, frequency bandpass, gain, capacitance, resonant frequency, and/or effective standing wavelength properties.

As such, by adjusting an antenna characteristic of the first configurable antenna interface 108, it adjusts the amplitude and/or frequency of the first signal component 90 to produce a first adjusted signal component 98. Similarly, by adjusting an antenna characteristic of the second configurable antenna interface 110, it adjusts the amplitude and/or frequency of the second signal component 92 to produce a second adjusted signal component 100. Thus, the first and second adjusted signal components 98 and 100 more closely resemble the pre-distorted first and second signal components of an RF signal.

Figure 7:
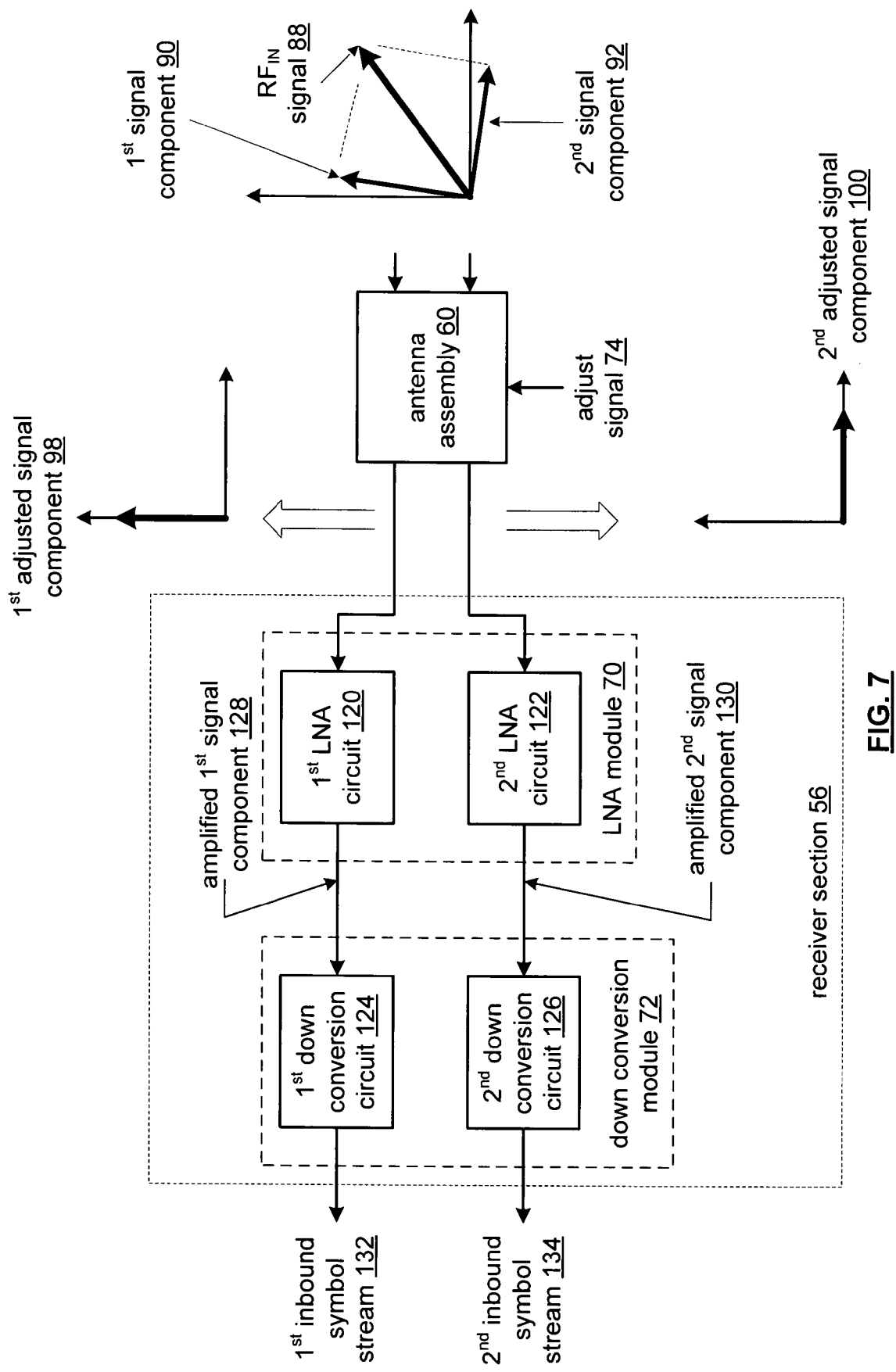
FIG. 7 is a schematic block diagram of another embodiment of an RF receiver in accordance with the present invention.

FIG. 7 is a schematic block diagram of another embodiment of an RF receiver that includes the antenna assembly 60 and the receiver section 56. The receiver section 56 includes the LNA module 70 and the down conversion module 72. The LNA module 70 includes a first LNA circuit 120 and a second LNA circuit 122. The down conversion module 72 includes a first down conversion circuit 124 and a second down conversion circuit 126.

The antenna assembly 60 receives the inbound RF signal 88 that is expressed as a vector having an amplitude component and a phase component and further includes the first and second signal components 90 and 92, where the first signal component 90 corresponds to a first axis representation of the inbound RF signal 88 and the second signal component 92 corresponds to a second axis representation of the inbound RF signal 88. The antenna assembly 60 adjusts amplitude and/or phase of the first and second signal components 90 and 92 to produce the first and second adjusted signal components 98 and 100.

The first LNA circuit 120, which may include one or more low noise amplifiers, amplifies the first adjusted signal component 98 to produce an amplified first signal component 128. The second LNA circuit 122, which may include one or more low noise amplifiers, amplifies the second adjusted signal component 100 to produce an amplified second signal component 130.

The first down conversion circuit 124 down converters the amplified first signal component 128 to produce the first inbound symbol stream 132. The second down conversion circuit 126 down converts the amplified second signal component 130 to produce the second inbound symbol stream 126. In an embodiment of each of the down conversion circuits 124 and 126, each circuit mixes in-phase (I) and quadrature (Q) components of the corresponding amplified signal component with in-phase and quadrature components of a receiver local oscillation to produce a mixed I signal and a mixed Q signal for each amplified signal component. Each pair of the mixed I and Q signals are combined to produce the first and second inbound symbol streams 132 and 134. In this embodiment, each of the first and second inbound symbol streams 132 and 134 includes phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the amplified first and second signal components 128 and 130 include amplitude information (e.g., +/−ΔA [amplitude shift] and/or A(t) [amplitude modulation]). To recover the amplitude information, the down conversion circuits 124 and 126 further includes an amplitude detector such as an envelope detector, a low pass filter, etc.

The baseband processing module 54 receives the first and second inbound symbol streams 132 and 134. In accordance with one or more wireless communication protocols, the baseband processing module converts the first inbound symbol stream 132 into first inbound data 76-1 and converts the second inbound symbol stream 134 into second inbound data 76-2. As such, the first inbound data 76-1 may be in accordance with a first wireless communication protocol and the second inbound data 76-2 may be in accordance with a second wireless communication protocol. Alternatively, the first and second inbound data 76-1 and 76-2 may be in accordance with the same wireless communication protocol.

In another embodiment, the receive section 56 may further include a combining module that combines the first and second inbound symbol streams into a combined inbound symbol stream. In this instance, the baseband processing module 54 converts the combined inbound symbol stream into the inbound data 76.

Figure 8:
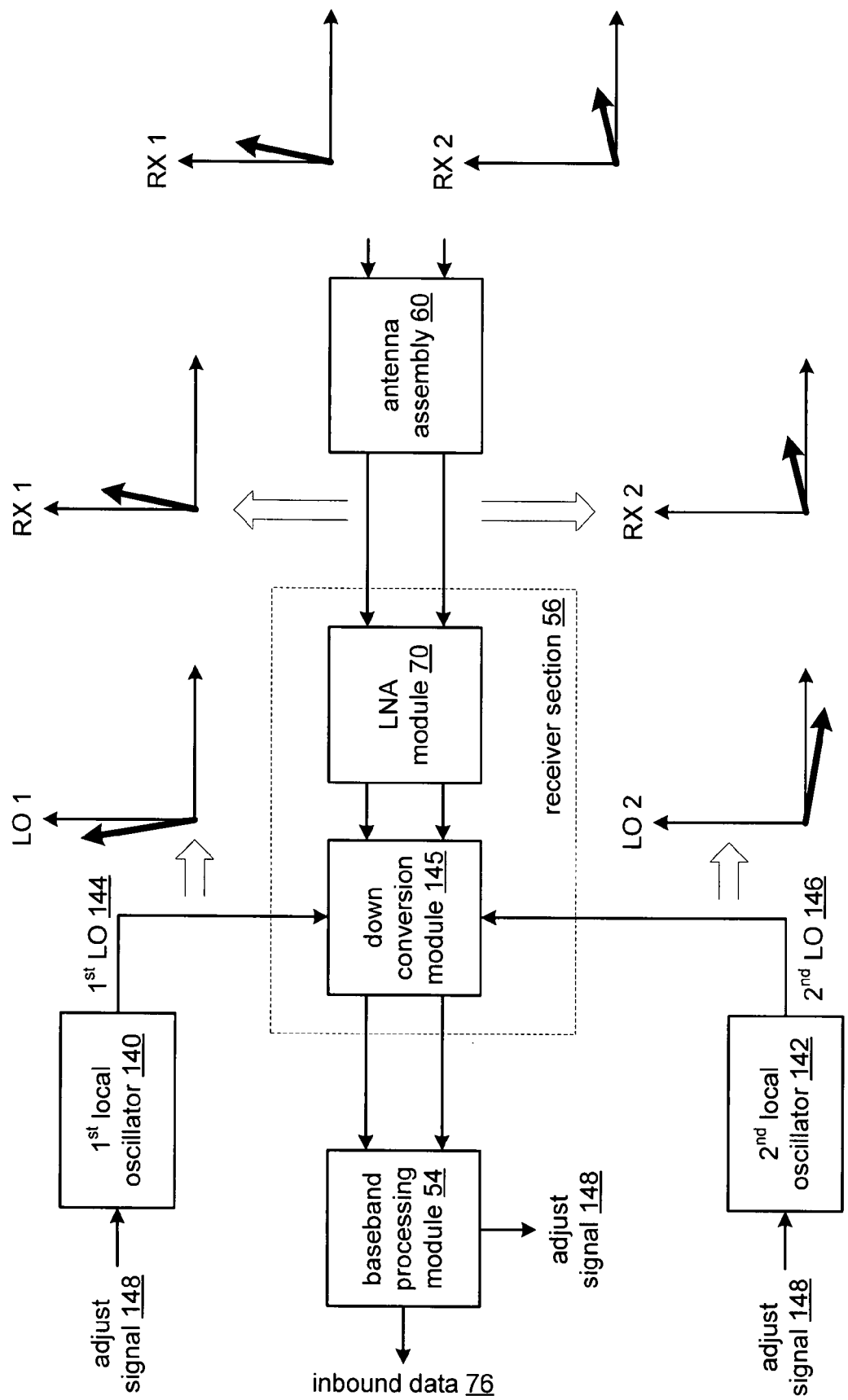
FIG. 8 is a schematic block diagram of another embodiment of an RF receiver in accordance with the present invention.

FIG. 8 is a schematic block diagram of another embodiment of an RF receiver that includes the antenna assembly 60, the receiver section 56, and the baseband processing module 54. The receiver section 56 includes the LNA module 70 and a down conversion module 145.

The antenna assembly 60 receives the inbound RF signal that includes a first signal component (RX 1) and a second signal component (RX-2). The antenna assembly 60 provides the first and second signal components (RX-1 and RX-2), as received, to the LNA module 70. The LNA module 70 amplifies the first signal component (RX-1) to produce an amplified first signal component and amplifies the second signal component (RX-2) to produce an amplified second signal component.

The down conversion module 145 processes the amplified first signal component, a first local oscillation 140, and a first phase adjust component of the adjust signal 148 to produce a phase adjusted first inbound symbol stream. The down conversion module 145 further processes the amplified second signal component, a second local oscillation 146, and a second phase adjust component of the adjust signal 148 to produce a phase adjusted second inbound symbol stream. The down conversion module 145 may further adjust amplitude of the phase adjusted first inbound symbol stream and/or of the phase adjusted second inbound symbol stream based on the adjust signal 148 to produce an adjusted first inbound symbol stream and an adjusted second inbound symbol stream.

For example, a first local oscillator 140 may produce the first local oscillation (LO) 144 to have a desired phase offset based on the phase adjust component of the adjust signal 148.

When the first LO 144 is mixed with the amplified first signal component, the phase distortion of the first signal component (RX-1) is compensated. Similarly, a second local oscillator 142 may produce the second local oscillation (LO) 146 to have a desired phase offset based on the phase adjust component of the adjust signal 148. When the second LO 146 is mixed with the amplified second signal component, the phase distortion of the second signal component (RX-2) is compensated.

The baseband processing module 54 convert the adjusted first and second inbound symbol streams into inbound data in accordance with one or more wireless communication standards as previously discussed. In addition, the baseband processing module generates the adjust signal 148.

To facilitate the generating the adjust signal 74, the receiver may perform a training sequence. In this training sequence, the antenna assembly 60 receives an inbound RF training signal that includes a first training signal component and a second training signal component. The low noise amplifier module 70 amplifies the first training signal component to produce an amplified first training signal component and amplifies the second training signal component to produce an amplified second training signal component.

The down conversion module 145 processes the amplified first training signal component, a first local oscillation 144, and a first training phase adjust component to produce a phase adjusted first inbound training symbol stream. The down conversion module 145 further processes the amplified second signal component, a second local oscillation 146, and a second training phase adjust component to produce a phase adjusted second inbound training symbol stream, wherein the first and second training phase adjust components are known (e.g., 0°). The down conversion module 145 may further adjust amplitude of the phase adjusted first inbound training symbol stream and/or of the phase adjusted second inbound training symbol stream based on a known training amplitude adjust component to produce an adjusted first inbound training symbol stream and an adjusted second inbound training symbol stream.

The baseband processing module 54 compares the adjusted first inbound training symbol stream and the adjusted second inbound training symbol stream with known inbound training symbol streams and, when the adjusted first inbound training symbol stream and the adjusted second inbound training symbol stream compares unfavorably with the known inbound training symbol streams, the baseband processing module 54 generates the adjust signal 145.

In an alternate embodiment, the baseband processing module 54 may use a received signal strength indication of each inbound RF training signal component to determine the phase and/or amplitude error. For example, assume the RF training signal is constant amplitude cosine signal with a 45° beamforming coefficient: $A*\cos(\omega_{RF}(t)+45)$. In this example, two orthogonal antennas should receive equal representations of the cosine signal [e.g., $1.414A*\cos(\omega_{RF}(t))$], where 1.414 is the square root of 2, if there is no distortion. If there is distortion, the orthogonal antennas will not receive equal representations of the cosine signal, where the unequal representations may be used to determine the phase error and/or the amplitude error. Note that the baseband processing module 54 may update the adjust signal 74 on a frame-by-frame basis, a communication-by-communication basis, and/or at any other desired interval.

In another embodiment, the receiver section 56 includes a combining module that combines the adjusted first and second inbound symbol streams to produce a combine inbound symbol stream. The baseband processing module 54 converts the combined inbound symbol stream into the inbound data 76.

Figure 9:
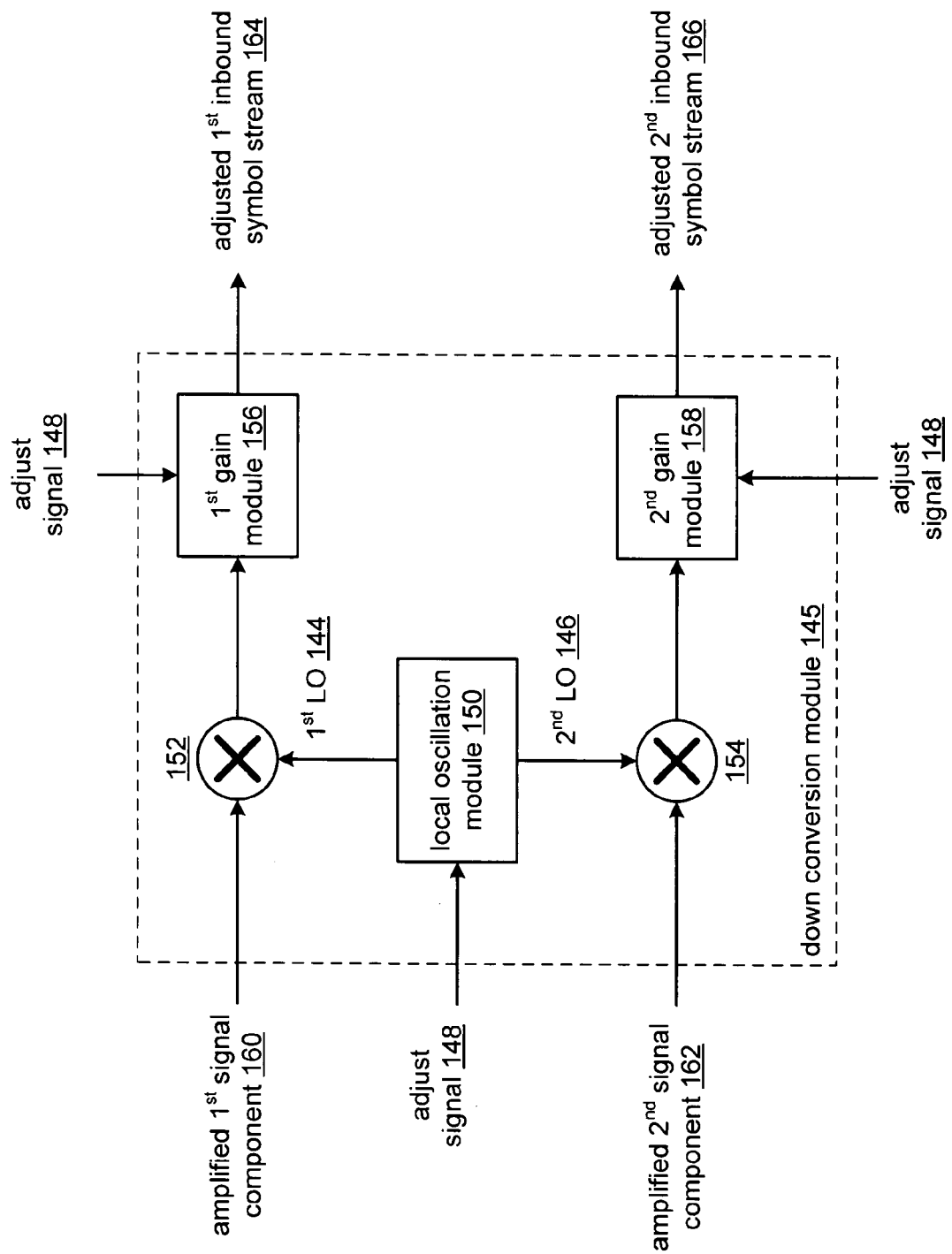
FIG. 9 is a schematic block diagram of an embodiment of a down-conversion module in accordance with the present invention.

FIG. 9 is a schematic block diagram of an embodiment of a down-conversion module 145 that includes a local oscillation module 150, first and second mixing modules 152 and 154, and first and second gain modules 156 and 158. The local oscillation module 150, which may include a crystal oscillator, phase locked loop, fractional-N synthesizer, a direct digital frequency synthesizer, a counter, a frequency multiplier, and/or a frequency divider, generates the first and second local oscillations and then adjusts them in accordance with the adjust signal 148 to produce a phase adjusted first local oscillation 144 and a phase adjusted second local oscillation 146. In an embodiment, a phase offset corresponding to the adjust signal 148 is fed into the feedback loop of an oscillation circuit to provide the phase adjusted first and second local oscillations 144 and 146.

The first mixing module 152, which may include one or more mixers, mixes the phase adjusted first local oscillation 144 with the amplified first signal component 160 to produce the phase adjusted first inbound symbol stream. The first gain module 156, which may be a programmable gain amplifier, an amplifier, etc., adjusts the amplitude of the phase adjusted first inbound symbol stream based on the adjust signal 148 to produce the adjusted first inbound symbol stream 164.

The second mixing module 154, which may include one or more mixers, mixes the phase adjusted second local oscillation 146 with the amplified second signal component 162 to produce the phase adjusted second inbound symbol stream. The second gain module 158, which may be a programmable gain amplifier, an amplifier, etc., adjusts the amplitude of the phase adjusted second inbound symbol stream based on the adjust signal 148 to produce the adjusted second inbound symbol stream 166.

Figure 10:
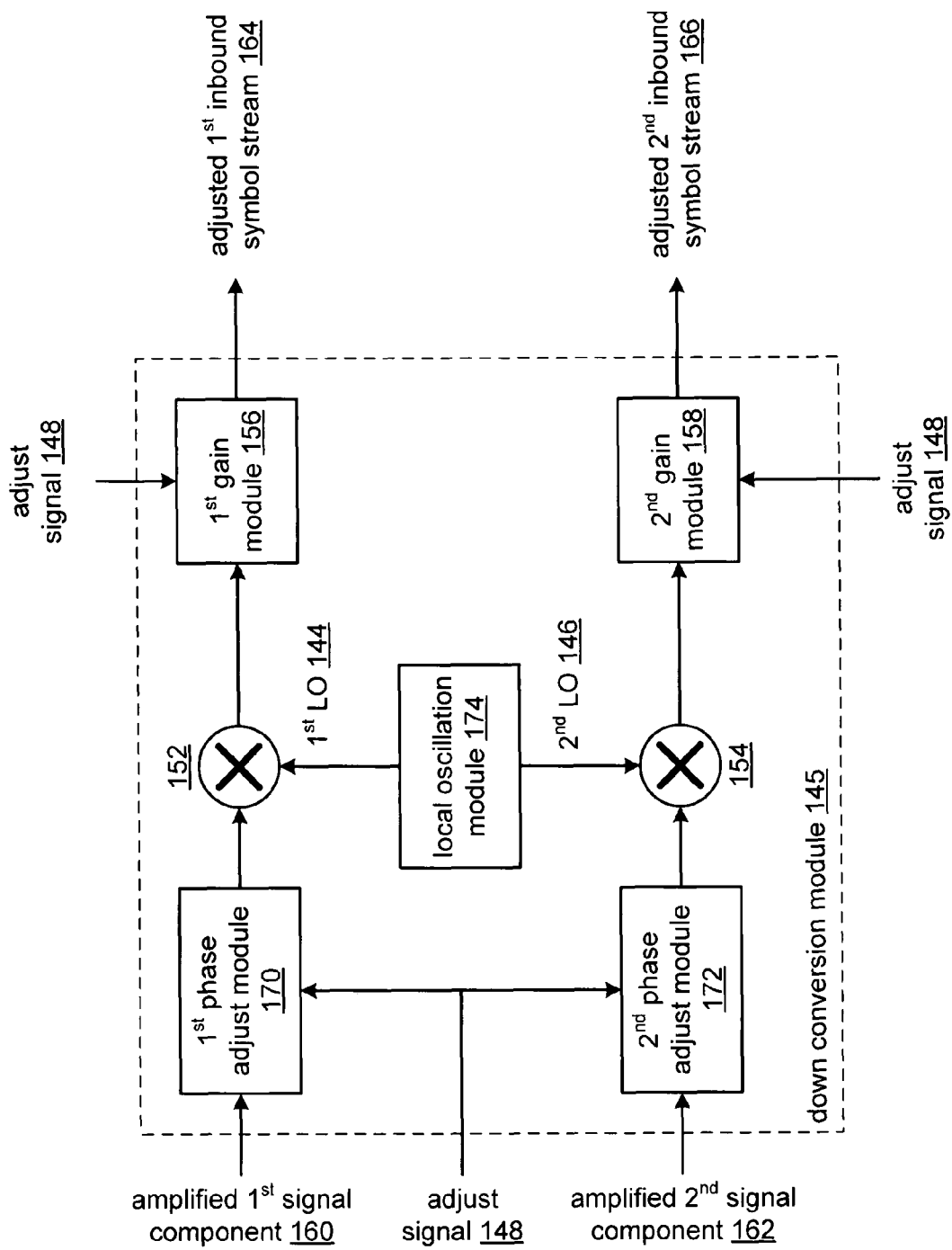
FIG. 10 is a schematic block diagram of another embodiment of a down-conversion module in accordance with the present invention.

FIG. 10 is a schematic block diagram of another embodiment of a down-conversion module 145 that includes the first and second mixing modules 152 and 154, the first and second gain modules 156 and 158, first and second phase adjust modules 170 and 172, and a local oscillation module 170. The local oscillation module 170, which may include a crystal oscillator, phase locked loop, fractional-N synthesizer, a direct digital frequency synthesizer, a counter, a frequency multiplier, and/or a frequency divider, generates the first and second local oscillations 144 and 146.

The first phase adjust module 170 adjusts phase of the amplified first signal component 160 in accordance with the adjust signal to produce a phase adjusted amplified first signal component. In one embodiment, the first phase adjust module 170 is an adjustable delay that delays the amplified first signal component 160 by a time duration corresponding to a fraction of a cycle of the signal 160. In another embodiment, the first phase adjust module 170 is a mixer that mixes the amplified first signal component 160 with a sinusoidal signal having the desired phase offset. In another embodiment, the first phase adjust module 170 may rotate a polar representation of the amplified first signal component 160 to produce the phase adjusted first signal component.

The first mixing module 152 mixes the first local oscillation 144 with the phase adjusted amplified first signal component to produce the phase adjusted first inbound symbol stream. The first gain module 156 adjusts the amplitude of the phase adjusted first inbound symbol stream based on the adjust signal 148 to produce the adjusted first inbound symbol stream 164.

The second phase adjust module 172, which may be implemented similarly to the first phase adjust module 170, adjusts phase of the amplified second signal component 162 in accordance with the adjust signal 148 to produce a phase adjusted amplified second signal component. The second mixing module 154 mixes the second local oscillation 146 with the phase adjusted amplified second signal component to produce the phase adjusted second inbound symbol stream. The second gain module 158 adjusts the amplitude of the phase adjusted second inbound symbol stream based on the adjust signal 148 to produce the adjusted second inbound symbol stream 166.

Figure 11:
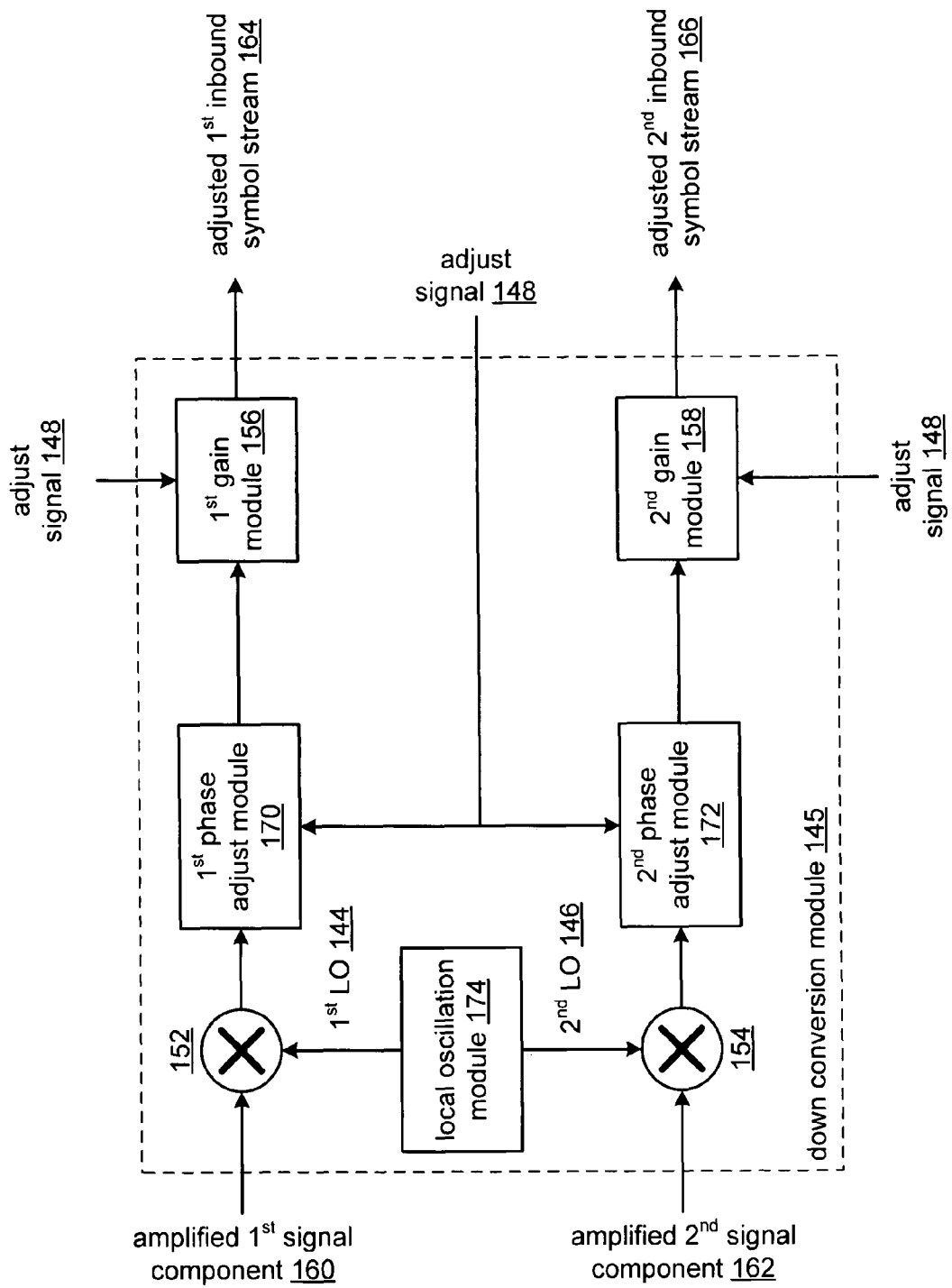
FIG. 11 is a schematic block diagram of another embodiment of a down-conversion module in accordance with the present invention.

FIG. 11 is a schematic block diagram of another embodiment of a down-conversion module 145 that includes the first and second mixing modules 152 and 154, the first and second gain modules 156 and 158, first and second phase adjust modules 170 and 172, and a local oscillation module 170. The local oscillation module 170, which may include a crystal oscillator, phase locked loop, fractional-N synthesizer, a direct digital frequency synthesizer, a counter, a frequency multiplier, and/or a frequency divider, generates the first and second local oscillations 144 and 146.

The first mixing module 152 mixes the first local oscillation 144 with the amplified first signal component 160 to produce a mixed first inbound symbol stream. The first phase adjust module 170 adjusts phase of the mixed first inbound symbol stream in accordance with the adjust signal 148 to produce a phase adjusted first inbound symbol stream. The first gain module 156 adjusts the amplitude of the phase adjusted first inbound symbol stream based on the adjust signal 148 to produce the adjusted first inbound symbol stream 164.

The second mixing module 154 mixes the second local oscillation 146 with the amplified second signal component 162 to produce a mixed second inbound symbol stream. The second phase adjust module 172 adjusts phase of the mixed second inbound symbol stream in accordance with the adjust signal 148 to produce a phase adjusted second inbound symbol stream. The second gain module 158 adjusts the amplitude of the phase adjusted second inbound symbol stream based on the adjust signal 148 to produce the adjusted second inbound symbol stream 166.

Figure 12:
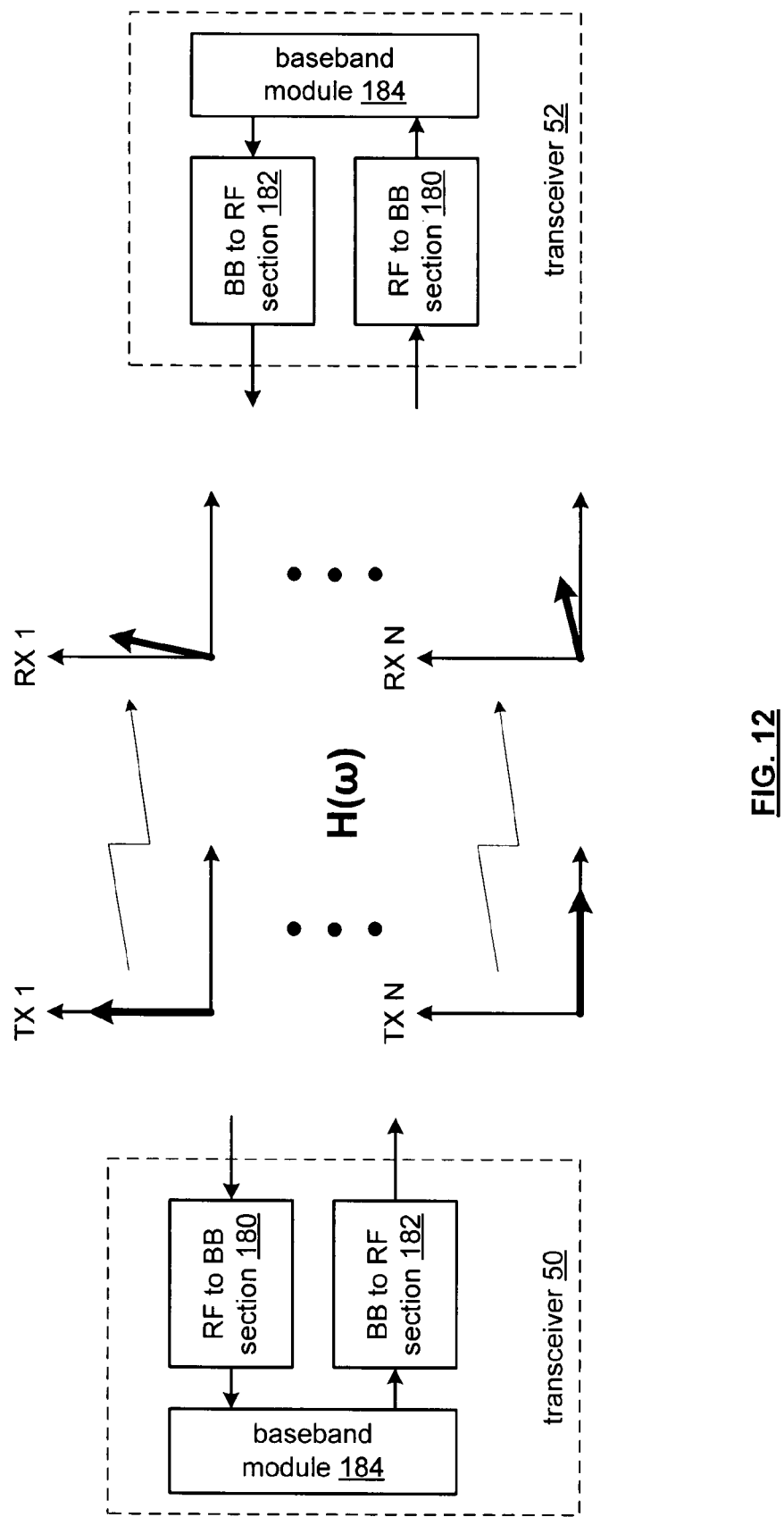
FIG. 12 is a schematic block diagram of another example of a communication between two RF transceivers in accordance with the present invention.

FIG. 12 is a schematic block diagram of another example of a communication between two RF transceivers 50 and 52, each of which includes a baseband processing module 54, an RF-to-baseband (BB) section 180 and a baseband-to-RF section 182. The RF transceivers 50 and 52 communicate via one or more RF channels in accordance with one or more wireless communication standards, which includes, but is not limited to, RFID, IEEE 802.11, Bluetooth, AMPS, digital AMPS, GSM, CDMA, wide bandwidth CDMA (WCMDA), LMDS, MMDS, high-speed downlink packet access (HSDPA), high-speed uplink packet access (HSUPA), Enhanced Data rates for GSM Evolution (EDGE), General Packet Radio Service (GPRS), and/or variations thereof.

The one or more channels supporting the communication have a channel response $H(\omega)$, which distorts the transmitted signals. For example, a first outbound RF signal may be transmitted by a first antenna (TX 1) and a second outbound RF signal may be transmitted by a second antenna (TX 2). In this example, the first and second outbound RF signals are represented as vectors having an amplitude [A(t)] component and a phase [$\Phi(t)$] component (which is shown as 0° with respect to the polarization of the antennas). For instance, the first outbound RF signal may be expressed as $A(t)\cos[\omega_{RF1}(t)+\omega_D(t)+\Phi(t)]$ and the second outbound RF signal may be expressed as $A(t)\cos[\omega_{RF1}(t)+\omega_D(t)+\Phi(t)+90°]$ or as $A(t)\sin[\omega_{RF1}(t)+\Phi D(t)+\phi(t)]$, where A(t) represents the amplitude information (e.g., a constant amplitude, amplitude modulation, and/or amplitude shift keying), the $\omega_{RF1}(t)$ represents the RF carrier frequency, the $\omega_D(t)$ represents the sub-carrier frequency of the data, and the $\Phi(t)$ represents phase information (e.g., a constant phase, phase modulation, and/or phase shift keying). In an alternate embodiment, the $\Phi(t)$ may be replaced with frequency information (e.g., frequency modulation, frequency shift keying, etc.).

When the first and second outbound RF signals are received by the second RF transceiver 52, the vectors are distorted (e.g., have an amplitude error and/or a phase error). In this example, both the phase and amplitude are distorted for each signal. For instance, the first inbound, or received, RF signal may be expressed as $A'(t)\cos[\omega_{RF1}(t)+\omega_D(t)+\Phi'(t)]$ and the second outbound RF signal may be expressed as $A'(t)\cos[\omega_{RF1}(t)+\omega_D(t)+\Phi'(t)+90°]$ or as $A'(t)\sin[\omega_{RF1}(t)+\omega D(t)+\Phi'(t)]$, where $A'(t)$ represents the received amplitude information (e.g., a constant amplitude, amplitude modulation, and/or amplitude shift keying), the $\omega_{RF1}(t)$ represents the RF carrier frequency, the $\omega_D(t)$ represents the sub-carrier frequency of the data, and the $\Phi'(t)$ represents the received phase information (e.g., a constant phase, phase modulation, and/or phase shift keying). As will be described below, the RF to BB section 180 and/or the BB to RF section 182 provide error correction to reduce the distortion of the received, or inbound, RF signals thereby improving quality of the communication.

The first and second RF signals may be representative of a variety of wireless communication protocols. For example, the first and second RF signals may be part, or all of, the transmitted signals in a multiple input multiple output (MIMO) communication. As another example, the first and second RF signals may be the same signal offset by an orthogonal relationship of the antennas or an induced orthogonal phase offset to provide in-air beamforming. As yet another example, the first and second RF signals may be different signals conveying different data using the orthogonal polarization of the antennas to provide isolation between the two signals. As a further example, the first and second RF signals may be the same signal transmitted simultaneously for redundancy and/or for increased transmit power. Note that while the first and second RF signals are shown as orthogonal signals with respect to each other, they may be of the same polarization, of the same phase offset, of different phase offsets, and/or a combination thereof. Further note that in this example, the transceivers 50 and 52 are communicating in a half duplex mode such that one of the transceivers 50 and 52 is transmitting and the other is receiving and then they switch such that the other is transmitting and the first one is receiving.

Figure 13:
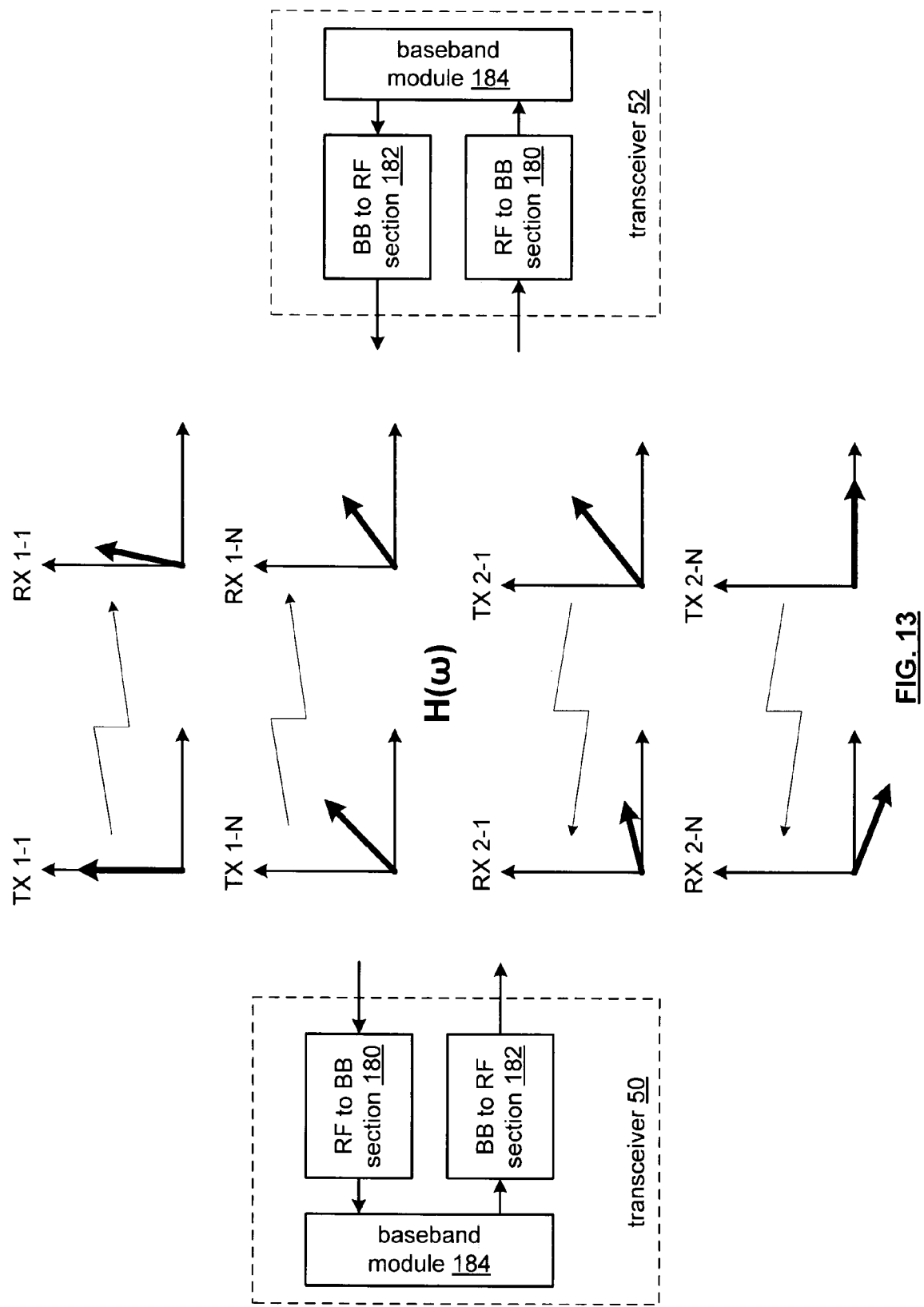
FIG. 13 is a schematic block diagram of another example of a communication between two RF transceivers in accordance with the present invention.

FIG. 13 is a schematic block diagram of another example of a communication between two RF transceivers 50 and 52, each of which includes a baseband processing module 54, an RF-to-baseband (BB) section 180 and a baseband-to-RF section 182. The RF transceivers 50 and 52 communicate via one or more up link (e.g., from transceiver 50 to transceiver 52) RF channels and via one or more down link (e.g., from transceiver 52 to transceiver 50) in accordance with one or more wireless communication standards, which includes, but is not limited to, RFID, IEEE 802.11, Bluetooth, AMPS, digital AMPS, GSM, CDMA, wide bandwidth CDMA (WCMDA), LMDS, MMDS, high-speed downlink packet access (HS-DPA), high-speed uplink packet access (HSUPA), Enhanced Data rates for GSM Evolution (EDGE), General Packet Radio Service (GPRS), and/or variations thereof.

The one or more up link and down link channels supporting the communication have a channel response $H(\omega)$, which distorts the transmitted signals. For example, a first outbound RF signal may be transmitted by a first antenna (TX 1-1) and a second outbound RF signal may be transmitted by a second antenna (TX 1-2) of transceiver 50 and a third outbound RF signal may be transmitted by a first antenna (TX 2-1) and a fourth outbound RF signal may be transmitted by a second antenna (TX 2-2) of transceiver 52. In this example, the first through the fourth outbound RF signals are represented as vectors having an amplitude [A(t)] component and a phase [$\Phi(t)$] component (which may be mathematically expressed as previously described with reference to FIG. 12).

When the first and second outbound RF signals are received by the second RF transceiver 52, the vectors are distorted and when the third and fourth outbound RF signals are received by transceiver 50, the vectors are also distorted. In this example, both the phase and amplitude are distorted for each signal. As will be described below, the RF to BB section 180 and/or the BB to RF section 182 provide error correction to reduce the distortion of the received, or inbound, RF signals thereby improving quality of the communication.

The first through fourth RF signals may be representative of a variety of wireless communication protocols. For example, the first through fourth RF signals may be part, or all of, the transmitted signals in a multiple input multiple output (MIMO) communication. As another example, the first through fourth RF signals may be the same signal offset by an orthogonal relationship of the antennas or an induced orthogonal phase offset to provide in-air beamforming. As yet another example, the first through fourth RF signals may be different signals conveying different data using the orthogonal polarization of the antennas to provide isolation between the signals. As a further example, the first and second RF signals may be the same signal and the third and fourth RF signals may be the same signal that are transmitted simultaneously for redundancy and/or for increased transmit power. Note that while the first and second RF signals and the third and fourth RF signals are shown as orthogonal signals with respect to each other, they may be of the same polarization, of the same phase offset, of different phase offsets, and/or a combination thereof. Further note that in this example, the transceivers 50 and 52 are communicating in a full duplex mode such that the transceivers 50 and 52 are capable of transmitting and receiving at the same time.

Figure 14:
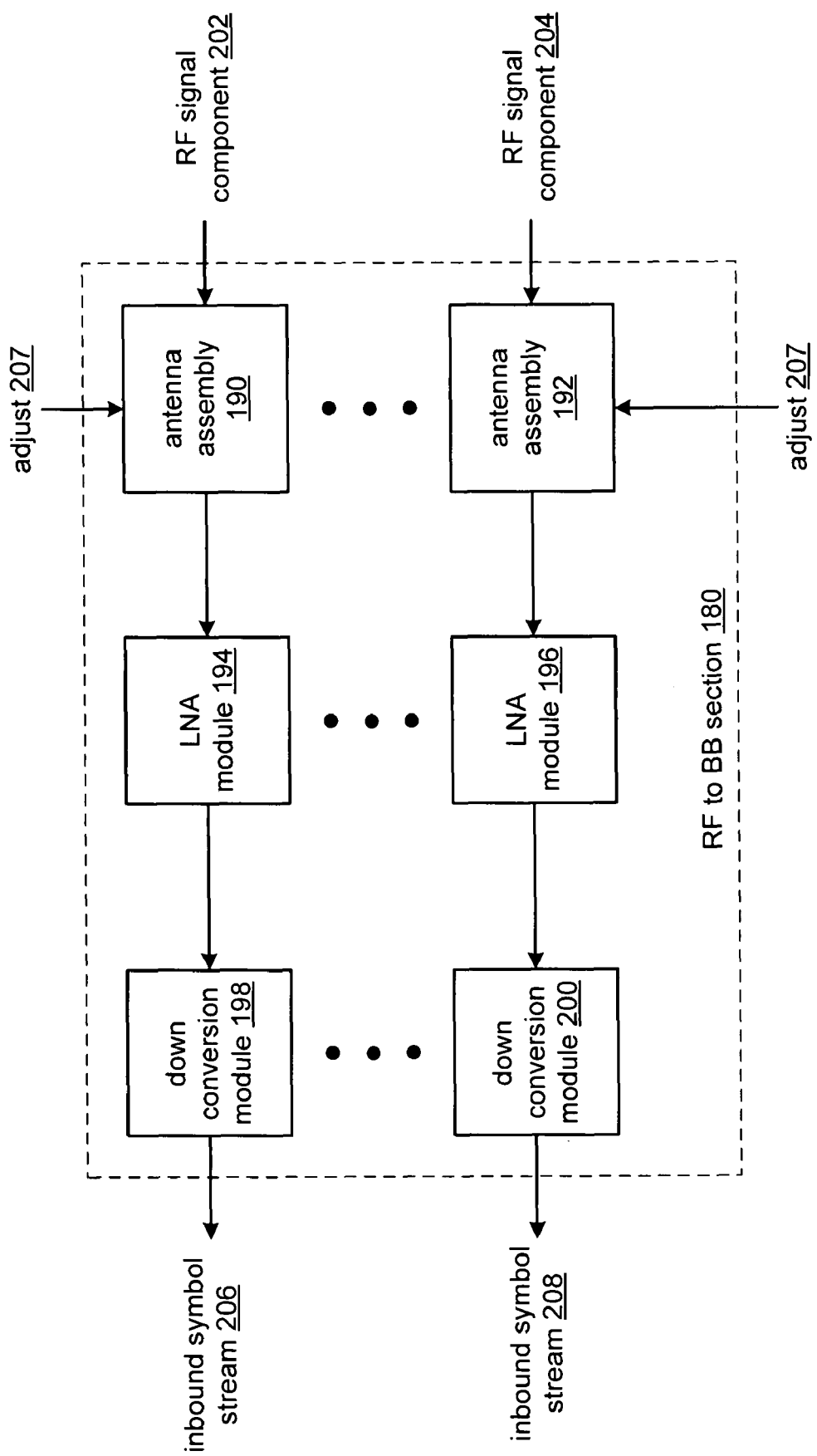
FIG. 14 is a schematic block diagram of an embodiment of an RF to baseband section in accordance with the present invention.

FIG. 14 is a schematic block diagram of an embodiment of an RF to baseband section 180 that includes a plurality of antenna assemblies 190-192, a plurality of LNA modules 194-196, and a plurality of down conversion modules 198-200. The plurality of configurable antenna assemblies 190-192 receives the plurality of RF signal components 202-204.

The plurality of configurable antenna assemblies 190-192 adjusts an antenna characteristic of at least one of the plurality of configurable antenna assemblies 190-192 based on an adjust signal 207. The baseband processing module 184 may generate the adjust signal 207 by determining whether an RF signal component of the plurality of RF signal components has an expected signal property (e.g., amplitude, phase, frequency, etc.) based on a desired relationship between the plurality of RF signal components. When the RF signal component does not have the expected signal property, the baseband processing module 184 generates the adjust signal 207 such that the plurality of antenna assemblies of the RF to baseband section 180 adjusts the received RF signal components to substantially have the expected signal property.

The plurality of configurable antenna assemblies 190-192 provides a plurality of adjusted RF signal components to the LNA modules 194-196, where the plurality of adjusted RF signal components includes at least one of the plurality of RF signal components adjusted by the at least one of the plurality of configurable antenna assemblies that adjusted its antenna characteristic based on the adjust signal 206. The plurality of LNA modules 194-196, each of which may include one or more low noise amplifiers coupled in series and/or in parallel, amplifies the plurality of adjusted RF signal components to produce a plurality of amplified RF signal components. The plurality of down conversion modules 198-200, each of which may be similar to down conversion module 72, converts the plurality of amplified RF signal components into the plurality of inbound symbol streams 206-208.

In an embodiment, each of the plurality of configurable antenna assemblies 190-192 includes an antenna and an antenna interface. The antennas receive the corresponding ones of the plurality of RF signal components 202-204 and provide them, unadjusted, to the corresponding antenna interfaces. The antenna interface of at least one of the plurality of configurable antenna assemblies 190-192 adjusts its characteristics in accordance with the adjust signal 207. FIG. 6 illustrates an embodiment of an example of a configurable antenna assembly of the plurality of antenna assemblies 190-192.

In another embodiment, each of the plurality of configurable antenna assemblies includes an adjustable antenna and an antenna interface. The adjustable antenna of at least one of the plurality of adjustable antenna assemblies adjusts its antenna characteristics in accordance with the adjust signal 207 to produce an adjusted RF signal component. The corresponding one of the plurality of antenna interfaces provides the adjusted RF signal component to the corresponding one of the LNA modules 194-194. FIG. 5 illustrates an embodiment of an example of a configurable antenna assembly of the plurality of antenna assemblies 190-192.

Figure 15:
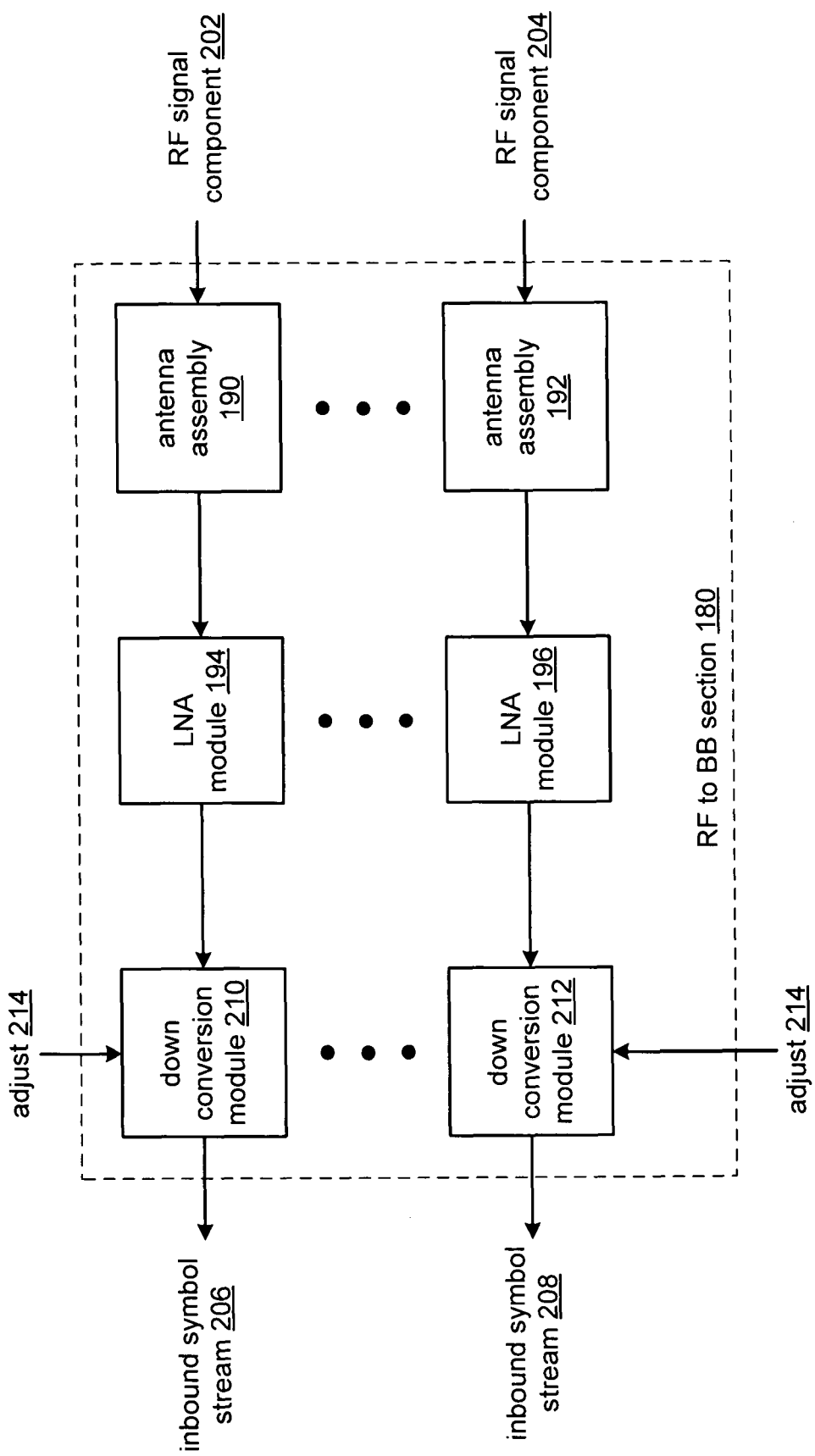
FIG. 15 is a schematic block diagram of another embodiment of an RF to baseband section in accordance with the present invention.

FIG. 15 is a schematic block diagram of another embodiment of an RF to baseband section 180 that includes a plurality of antenna assemblies 190-192, a plurality of LNA modules 194-196, and a plurality of down conversion modules 210-212. The plurality of antenna assemblies 190-192 provides the plurality of RF signal components 202-204 to the plurality of LNA modules 194-196.

The plurality of LNA modules 192-194 amplifies the plurality of RF signal components 202-204 to produce a plurality of amplified RF signal components. The plurality of down conversion modules 210-212, each of which may be implemented as shown in FIGS. 9-11, converts the plurality of amplified RF signal components into the plurality of inbound symbol streams, wherein a down conversion characteristic of at least one of the plurality of down conversion modules is adjusted when the RF signal component does not have the expected signal property. The down conversion characteristics include one or more of LO phase, LO amplitude, resulting mixed signal phase, resulting mixed signal amplitude, adjust phase or amplitude of signal components prior to mixing with LO.

Figure 16:
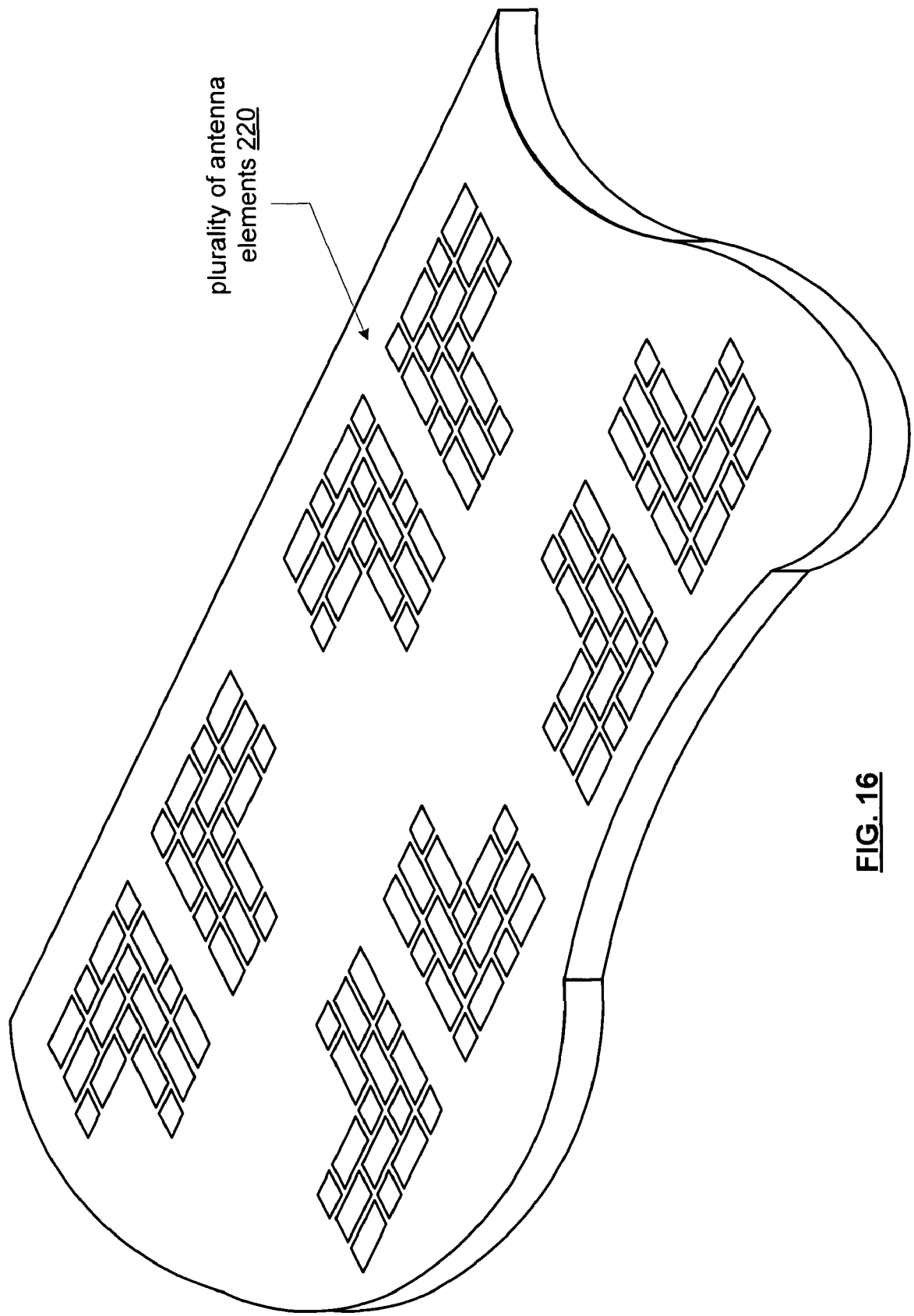
FIG. 16 is a diagram of an embodiment of an antenna assembly in accordance with the present invention.

FIG. 16 is a diagram of an embodiment of an antenna assembly 60, 190, or 192 that includes a plurality of antenna elements 220. The plurality of antenna elements 220 may be microstrips and/or metal traces on a printed circuit board (PCB) and/or on an integrated circuit. The plurality of antenna elements 220 may be configured into one or more of a two-dimensional mono pole antenna, a two-dimensional dipole antenna, a two-dimensional helix antenna, and/or a two-dimensional meandering antenna and/or may be configured into one or more of a three-dimensional helix antenna, a three-dimensional aperture antenna, a three-dimensional dipole antenna, and/or a three-dimensional reflector antenna.

For example, if the plurality of antenna elements 220 are configured into a pair of two-dimensional dipole antennas, the desired length should be ½ the wavelength of the RF signals it transceives. The wavelength of a signal may be expressed as: $(\lambda)=c/f$, where c is the speed of light and f is frequency. For example, a ½ wavelength antenna at 900 MHz has a total length of approximately 16.5 centimeters (i.e., $0.50*(3\times10^8 \text{ m/s})/(900\times10^6 \text{ c/s})=0.50*33$ cm, where m/s is meters per second and c/s is cycles per second). As another example, a ½ wavelength antenna at 2400 MHz has a total length of approximately 6.25 cm (i.e., $0.50*(3\times10^8 \text{ m/s})/(2.4\times10^9 \text{ c/s})=0.50*12.5$ cm). As another example, a ½ wavelength antenna at 60 GHz has a total length of approximately 0.25 cm (i.e., $0.50*(3\times10^8 \text{ m/s})/(60\times10^9 \text{ c/s})=0.50*0.5$ cm). Thus, by changing the length of the antenna by adding or deleting antenna elements 200 from an antenna (which may be done by transistors, inductive coupling, capacitive coupling, and/or switches), its length may be changed to accommodate different frequency bands.

In addition to changing the overall length of an antenna by adding or deleting antenna elements, the antenna's bandwidth, frequency response, quality factor, bandpass region, center frequency, and/or impedance may be adjusted by changing the inductance, resistance, and/or capacitor of the configured antenna. For instance, each microstrip of the plurality of microstrips has an inductance and a resistance and is proximately located to one another. Thus, by coupling the microstrips in parallel and/or in series to provide the desired antenna length, the inductance, capacitance, and/or resistance can also be adjusted to provide the desired antenna characteristics.

In an embodiment, the configurable antenna assembly 60, 190, 192 includes a configurable antenna structure and an antenna interface. The configurable antenna structure includes the plurality of antenna elements 220. In a first mode of operation of the transceiver 50 or 52, the plurality of antenna elements are configured to provide a first antenna structure for receiving an inbound RF signal and a second antenna structure for transmitting an outbound RF signal. The first antenna structure is configured in accordance with a receive adjust signal to adjust an antenna characteristic such that it adjusts phase and/or amplitude of the inbound RF signal. The second antenna structure is configured in accordance with a transmit adjust signal to adjust an antenna characteristic such that it adjusts phase and/or amplitude of the outbound RF signal. The antenna interface couples the configurable antenna structure to an RF transceiver front-end (e.g., the RF to BB section 180, the BB to RF section 182, the LNA module 70, and/or the power amplifier module 242 [FIG. 18]). A pictorial representation of this mode was illustrated in FIGS. 2 and 12.

When the transceiver 50 or 52 is in a second mode, the configurable antenna structure configures the plurality of antenna elements to provide third and fourth antennas. In this mode, which is an extension of the first mode, the third antenna structure receives a second representation of the inbound RF signal and the first antenna structure receives a first representation of the inbound RF signal. The fourth antenna structure transmits a second outbound RF signal and the second antenna structure transmits a first outbound RF signal. A pictorial representation of this mode was illustrated in FIGS. 3 and 13.

When the transceiver 50 or 52 is in a receive mode, the configurable antenna structure configures the plurality of antenna elements 220 to provide a first receive antenna structure and a second receive antenna structure. The first receive antenna structure receives a first representation of the inbound RF signal and the second receive antenna structure receives a second representation of the inbound RF signal. In this mode, the first and second receive antenna structures are configured in accordance with the receive adjust signal to adjust an antenna characteristic such that they adjust phase and/or amplitude of the first and/or second representations of the inbound RF signal.

When the transceiver 50 or 52 is in a transmit mode, the configurable antenna structure configures the plurality of antenna elements 220 to provide a first transmit antenna structure and a second transmit antenna structure. The first transmit antenna structure transmits a first outbound RF signal and the second transmit antenna structure transmits a second outbound RF signal. The first and second transmit antenna structures are configured in accordance with the transmit adjust signal to adjust an antenna characteristic such that they adjust phase and/or amplitude of the first and/or second outbound RF signals.

Figure 17:
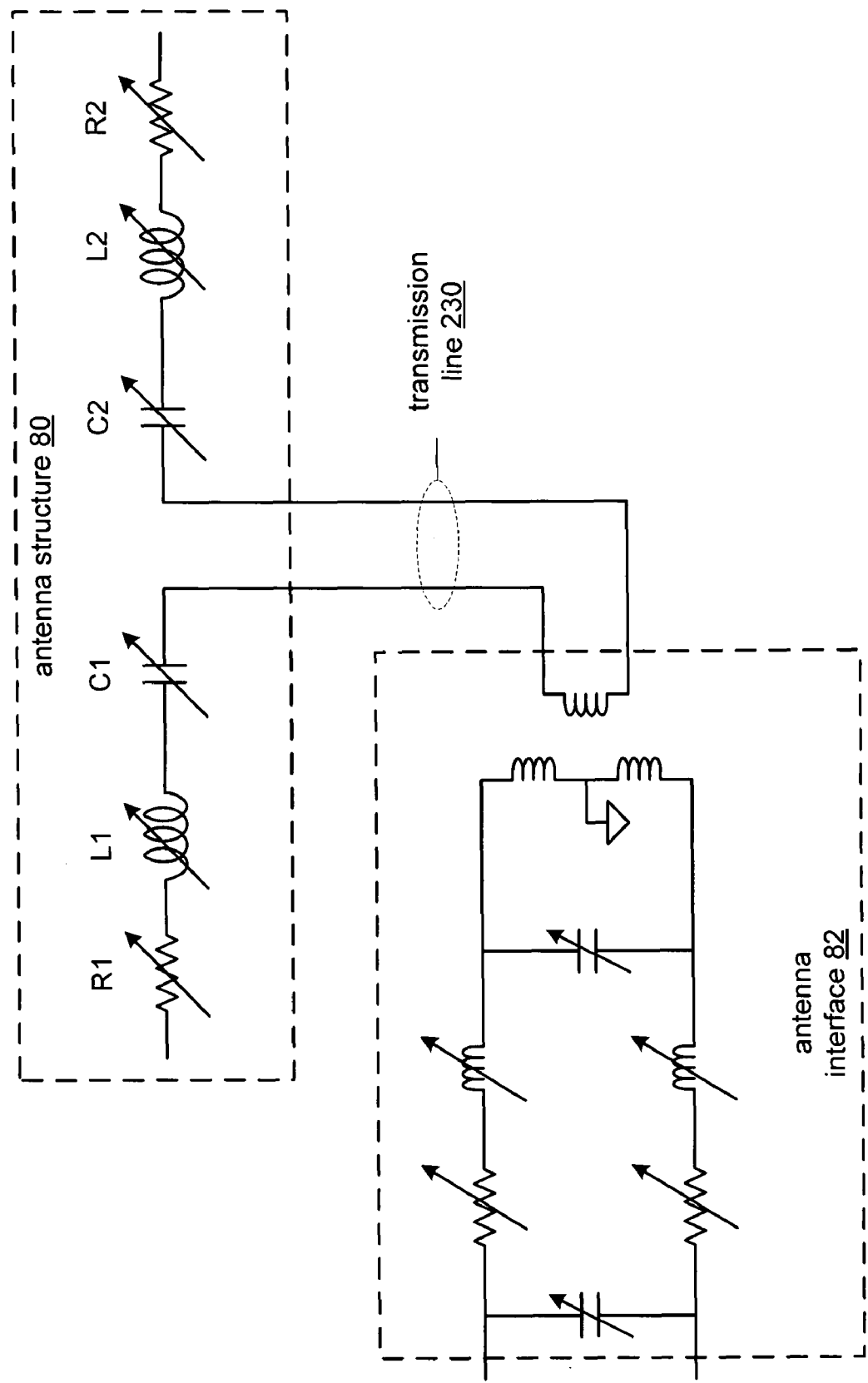
FIG. 17 is a schematic block diagram of another embodiment of an antenna assembly in accordance with the present invention.

FIG. 17 is a schematic block diagram of another embodiment of a configurable antenna assembly 60, 190, 192 that includes an antenna structure 80 and an antenna interface 82. In this embodiment, the antenna structure 80 may include a plurality of antenna elements 220 as previously described in FIG. 16 such that antenna characteristics can be adjusted or the antenna structure 80 may include a plurality of fixed antennas. The antenna interface 82 includes a transformer balun, a plurality of variable and/or fixed resistors, a plurality of variable and/or fixed inductors, and/or a plurality of variable and/or fixed capacitors. The antenna interface 82 is coupled to the antenna structure 80 via a transmission line 230.

In one embodiment, the antenna structure includes one or more fixed antennas and the antenna interface 82 has its characteristics adjusted to provide the desired RF signal distortion compensation. In another embodiment, the antenna structure includes one or more adjustable antennas and the antenna interface 82 includes fixed components, where the characteristics of the adjustable antenna(s) are adjusted to provide the desired RF signal distortion compensation. In yet another embodiment, the antenna structure includes one or more adjustable antennas and the antenna interface 82 includes adjustable components. In this embodiment, the antenna structure 80 provides coarse distortion compensation and the antenna interface 82 provides fine distortion compensation.

In the embodiment of the antenna structure 80 including one or more fixed antennas and the antenna interface 82 including adjustable components, when the transceiver 50 or 52 is in a first mode, the antenna structure 80 provides a first antenna structure and a second antenna structure. The first antenna structure receives an inbound RF signal and the second antenna structure transmits an outbound RF signal. The configurable antenna interface 82 provides a first antenna interface and a second antenna interface. The first antenna interface is configured in accordance with a receive adjust signal to adjust phase and/or amplitude of the inbound RF signal. The second antenna interface is configured in accordance with a transmit adjust signal to adjust phase and/or amplitude of the outbound RF signal.

When the transceiver 50 or 52 is in a second mode, which is an extension of the previous mode, the antenna structure provides a third antenna structure and a fourth antenna structure. The third antenna structure receives a second representation of the inbound RF signal and the first antenna structure receives a first representation of the inbound RF signal. The fourth antenna structure transmits a second outbound RF signal and the second antenna structure transmits a first outbound RF signal. The configurable antenna interface provides a third antenna interface and a fourth antenna interface. The first and third antenna interfaces are configured in accordance with the receive adjust signal to adjust phase and/or amplitude of at the first and/or second representations of the inbound RF signal. The second and fourth antenna interfaces are configured in accordance with the transmit adjust signal to adjust phase and/or amplitude of the first and/or second outbound RF signals.

When the transceiver 50 or 52 is in a receive mode, the antenna structure provide a first receive antenna structure and a second receive antenna structure. The first receive antenna structure receives a first representation of the inbound RF signal and the second receive antenna structure receives a second representation of the inbound RF signal. The configurable antenna interface provides a first receive antenna interface and a second receive antenna interface. The first and second receive antenna interfaces are configured in accordance with the receive adjust signal to adjust phase and/or amplitude of the first and/or second representations of the inbound RF signal.

When the transceiver 50 or 52 is in a transmit mode, the antenna structure provides a first transmit antenna structure and a second transmit antenna structure. The first transmit antenna structure transmits a first outbound RF signal and the second transmit antenna structure transmits a second outbound RF signal. The configurable antenna interface provides a first transmit antenna interface and a second transmit antenna interface. The first and second transmit antenna interfaces are configured in accordance with the transmit adjust signal to adjust phase and/or amplitude of the first and/or second outbound RF signal.

Figure 18:
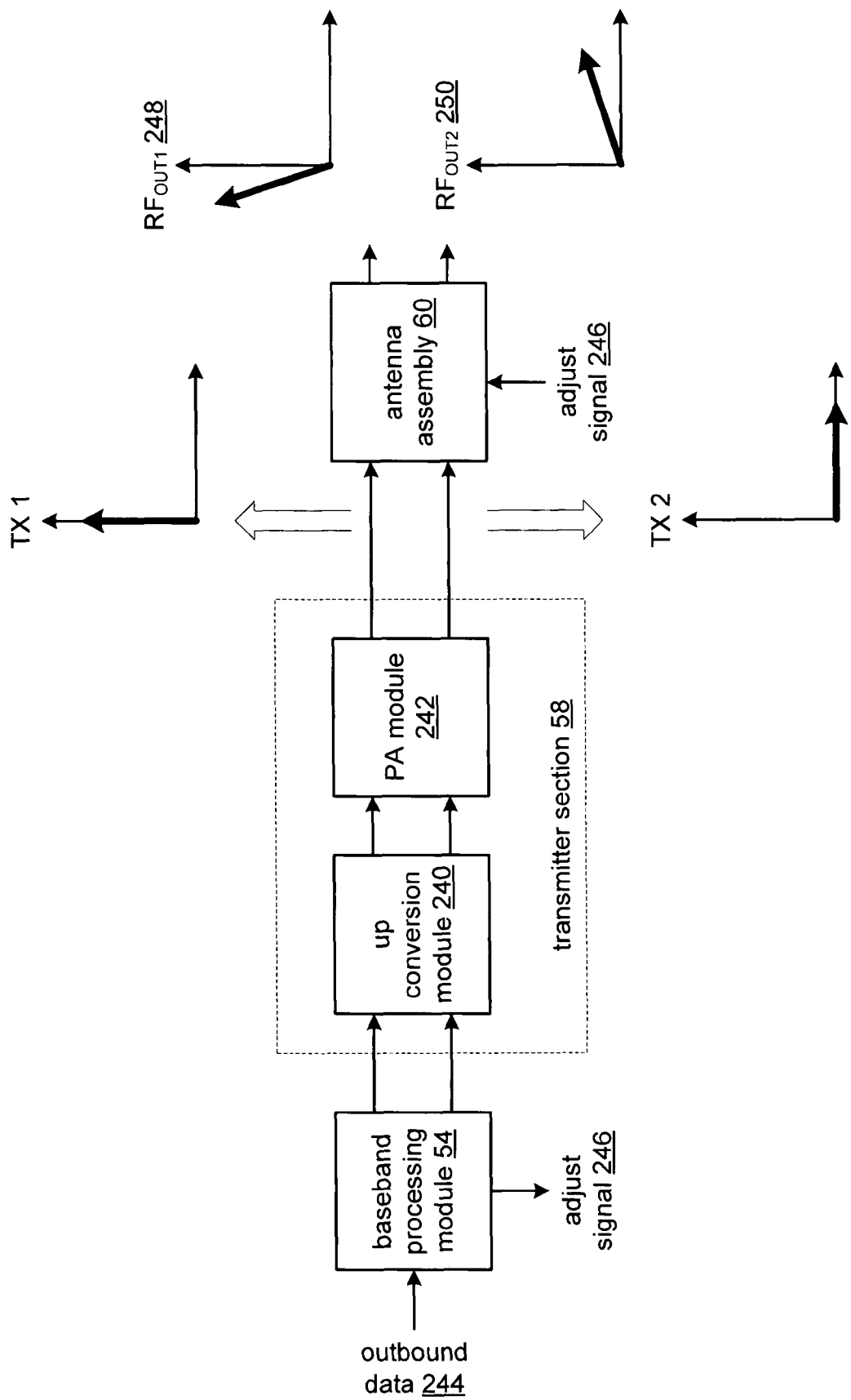
FIG. 18 is a schematic block diagram of an embodiment of an RF transmitter in accordance with the present invention.

FIG. 18 is a schematic block diagram of an embodiment of an RF transmitter that includes the baseband processing module, the transmitter section 58, and the antenna assembly 60. The transmitter section 58 includes an up-conversion module 240 and a power amplifier (PA) module 242.

The baseband processing module 54 converts outbound data 244, which may be voice signals, audio files, text messages, video files, image files, and/or video graphics, into a first outbound symbol stream and a second outbound symbol stream in accordance with one or more of the wireless communication protocols. The baseband processing module 54 also generate an adjust signal 246.

The up conversion module 240 converts the first outbound symbol stream into a first up converted signal and converts the second outbound symbol stream into a second up converted signal. In an embodiment, in-phase and quadrature components of the first and second outbound symbol streams are mixed with in-phase and quadrature components of a transmit local oscillation to produce the first and second up-converted signals. In another embodiment, each of the first and second outbound symbol streams provides phase information (e.g., $+/-\Delta\theta$ [phase shift] and/or $\theta(t)$ [phase modulation]) that adjusts the phase of the transmit local oscillation to produce phase adjusted up-converted signals. In this embodiment, the phase adjusted up-converted signals provide the first and second up-converted signals. In another embodiment, the first and second outbound symbol streams further includes amplitude information (e.g., $A(t)$ [amplitude modulation]), which is used to adjust the amplitude of the phase adjusted up converted signal to produce the first and second up-converted signals. In yet another embodiment, the first and second outbound symbol streams provide frequency information (e.g., $+/-\Delta f$ [frequency shift] and/or $f(t)$ [frequency modulation]) that adjusts the frequency of the transmit local oscillation to produce frequency adjusted up-converted signals. In this embodiment, the frequency adjusted up-converted signals provide the first and second up-converted signals. In another embodiment, the first and second outbound symbol stream further includes amplitude information, which is used to adjust the amplitude of the frequency adjusted up-converted signals to produce the first and second up-converted signals. In a further embodiment, the first and second outbound symbol streams provide amplitude information (e.g., +/−ΔA [amplitude shift] and/or A(t) [amplitude modulation) that adjusts the amplitude of the transmit local oscillation to produce the first and second up-converted signals.

The power amplifier module 242, which may include one or more power amplifier drivers and one or more power amplifiers coupled in series and/or in parallel, amplifies the first and second up converted signals to produce first and second outbound RF signals (TX-1 and TX-2). The antenna assembly 60 transmits the first and second outbound RF signals 248 and 250, wherein the antenna assembly adjusts amplitude and/or phase of the first and/or second outbound RF signals based on the adjust signal 246. As previously discussed the antenna assembly 60 may adjust the characteristics of one or more antennas and/or adjust the characteristics of one or more antenna interfaces such that it adjusts the phase and/or amplitude of the RF signals it transceives.

In this embodiment, the output of the transmitter section 58 has the desired amplitude and phase of the two outbound RF signals. As shown, TX-1 and TX-2 have approximately the same amplitude and are offset by 90°. When the RF signals are transmitted via a channel, or channels, to a receiver, the signals will be distorted. The antenna assembly pre-distorts the outbound RF signals 248 and 250 based on the adjust signal 246 such that when the pre-distorted signals are received by the receiver, they are approximately equal to the output of the transmitter section 58 less attenuate due to distance between the transmitter and the receiver. Note that TX-1 and TX-2 may be of the same polarization, have the same phase offset, and/or have different phase offsets. Further note that TX-1 and TX-2 may be transmitting the same data in accordance with one of the wireless communication protocols or different data in accordance with different ones of the wireless communication protocols.

To facilitate the generating the adjust signal 246, the transmitter may perform a training sequence. In this training sequence, the baseband processing module 54 converts outbound training data into a first outbound training symbol stream and a second outbound training symbol stream. In addition, the baseband processing module 54 generates a training adjust signal (e.g., zero degree phase adjust and zero amplitude adjust). When a response to the training signals are received, the baseband processing module interprets the response to the first and second outbound training symbol streams to generate the adjust signal. Note that the outbound training data may correspond to the signal detection portion of a packet or frame (e.g., the short and/or long training sequence of an IEEE 802.11 frame), may be a proprietary training sequence, and/or any other form of transmit and ACK back signaling protocols. Further note that the response may be a received signal strength indication, a repeat of first and second training symbol streams (i.e., inbound training symbols), a phase adjustment indication (e.g., the receiver provides feedback as to the phase distortion), a channel response as determined by the receiver, and/or an amplitude adjustment indication (e.g., the receiver provides feedback as to the amplitude distortion).

The up conversion module 240 converts the first outbound training symbol stream into a first up converted training signal and converts the second outbound training symbol stream into a second up converted training signal. The power amplifier module 242 amplifies the first and second up converted training signals to produce first and second outbound RF training signals. The antenna assembly 60 transmits the first and second outbound RF training signals in accordance with the training adjust signal.

In an embodiment, the baseband processing module generates the adjust signal to provide in-air beamforming, antenna polarization adjustment, and/or antenna polarization. In another embodiment, the baseband processing module converts first outbound data 244-1 of the outbound data into the first outbound symbol stream and converts second outbound data 244-2 of the outbound data into the second outbound symbol stream.

Figure 19:
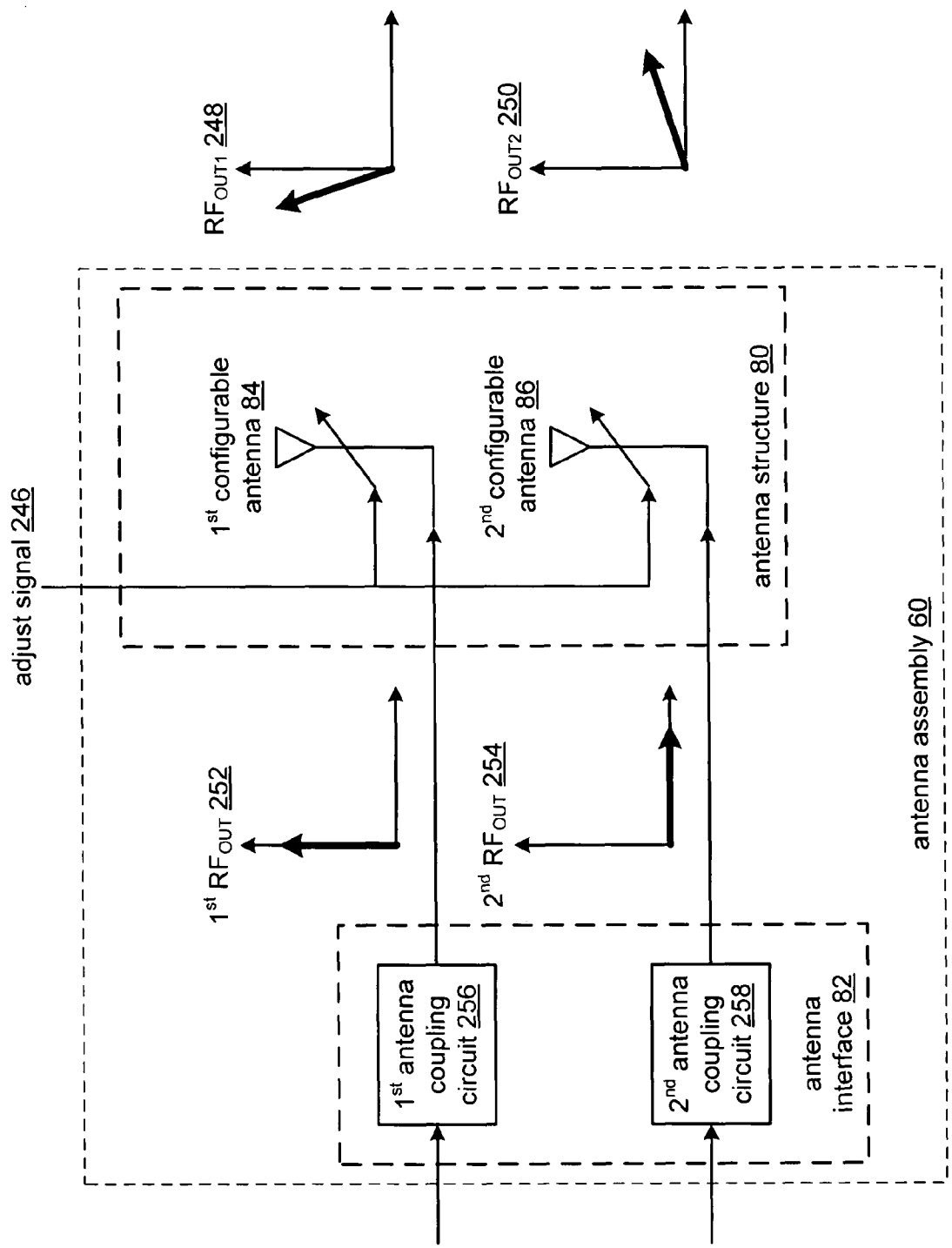
FIG. 19 is a schematic block diagram of another embodiment of an antenna assembly in accordance with the present invention.

FIG. 19 is a schematic block diagram of another embodiment of an antenna assembly 60 that includes an antenna structure 80 and an antenna interface 82. The antenna structure 80 includes a first configurable antenna 84 and a second configurable antenna 86. The antenna interface 82 includes a first antenna coupling circuit 256 and a second antenna coupling circuit 258.

The first antenna coupling circuit 256, which may include a transformer balun, an impedance matching circuit, a bandpass filter, and/or a transmission line, provides a first outbound RF signal 252 from the power amplifier module 242 to the first configurable antenna 84. The second antenna coupling circuit 258, which may include a transformer balun, an impedance matching circuit, a bandpass filter, and/or a transmission line, provides a second outbound RF signal 254 from the power amplifier module 242 to the second configurable antenna 86. The first and second outbound RF signals 252 and 254 each have a desired amplitude and phase.

To pre-compensate for channel distortion, the first configurable antenna 84 adjusts the amplitude and/or phase of the first outbound RF signal 252 in accordance with the adjust signal 246 and the second configurable antenna 86 adjusts the amplitude and/or phase of the second outbound RF signal 254 in accordance with the adjust signal 246. The adjustment of the first and/or second configurable antennas 84 and 86 may be done by adjusting an antenna characteristic, which includes, but is not limited to, antenna bandwidth, antenna quality factor (Q), inductance, resistance, frequency bandpass, gain, capacitance, center frequency, and/or effective wavelength. Note that the first and second configurable antennas 84 and 86 may be implemented as shown in FIGS. 16 and/or 17.

In this embodiment, by adjusting an antenna characteristic of the first configurable antenna 84, it adjusts the amplitude and/or frequency of the first outbound RF signal 252 to produce a first adjusted outbound RF signal 248. Similarly, by adjusting an antenna characteristic of the second configurable antenna 86, it adjusts the amplitude and/or frequency of the second outbound RF signal 254 to produce a second adjusted RF signal 250. Thus, when the first and second adjusted outbound RF signals 248 and 250 are received by the receiver, they more closely resemble the first and second outbound RF signals 252 and 254. Note that the first and second configurable antennas 84 and 86 may have an orthogonal relationship as shown, they may have the same polarization, they may the same phase offset, and/or they may have different phase offsets.

Figure 20:
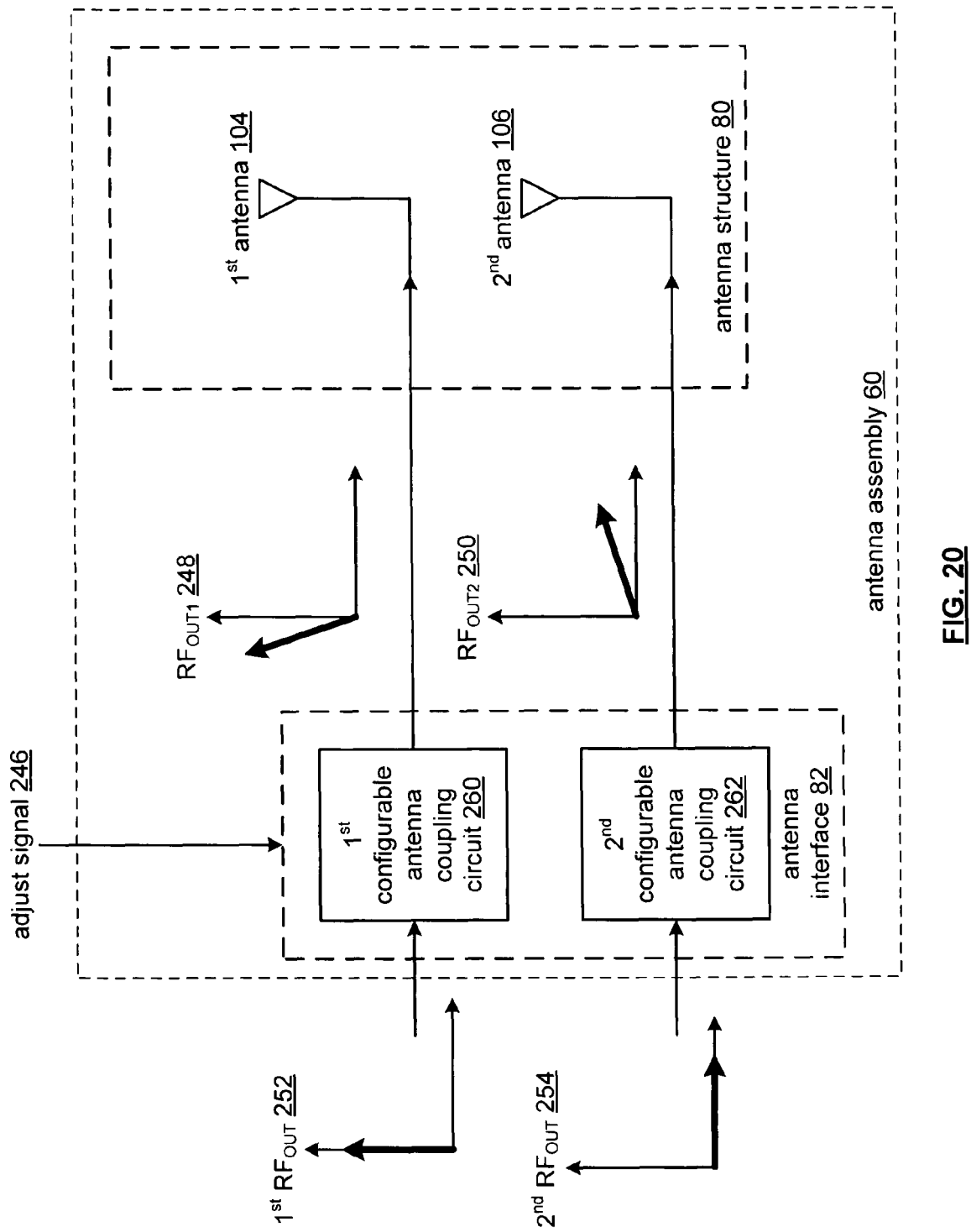
FIG. 20 is a schematic block diagram of another embodiment of an antenna assembly in accordance with the present invention.

FIG. 20 is a schematic block diagram of another embodiment of an antenna assembly 60 that includes an antenna structure 80 and an antenna interface 82. The antenna structure 80 includes a first antenna 104 and a second antenna 106. The antenna interface 82 includes a first configurable antenna coupling circuit 260 and a second configurable antenna coupling circuit 262.

To pre-compensate the channel distortion, the first configurable antenna interface 260, which may include a transformer balun, an adjustable impedance matching circuit, an adjustable bandpass filter, and/or a transmission line, adjusts the amplitude and/or phase of the first outbound RF signal 252 in accordance with the adjust signal 246 to produce the adjusted first outbound RF signal 248. The second configurable antenna interface 262, which may include a transformer balun, an adjustable impedance matching circuit, an adjustable bandpass filter, and/or a transmission line, adjusts the amplitude and/or phase of the second outbound RF signal 254 in accordance with the adjust signal 246 to produce the adjusted second outbound RF signal 250. The adjustment of the first and/or second configurable antenna interfaces 260 and 262 may be done by adjusting an antenna interface characteristic, which includes, but is not limited to, bandwidth, quality factor (Q), inductance, resistance, frequency bandpass, gain, capacitance, resonant frequency, and/or effective standing wavelength properties. Note that an embodiment of the first and second configurable antenna interfaces 260 and 262 may be implemented as shown in FIG. 17.

The first configurable antenna interface 260 provides the adjusted first outbound RF signal 248 to the first antenna 104 and the second configurable antenna interface 262 provides the adjusted second outbound RF signal 250 to the second antenna 106. The first antenna 104 transmits the adjusted first outbound RF signal 248 and the second antenna 106 transmits the adjusted second outbound RF signal 250.

Figure 21:
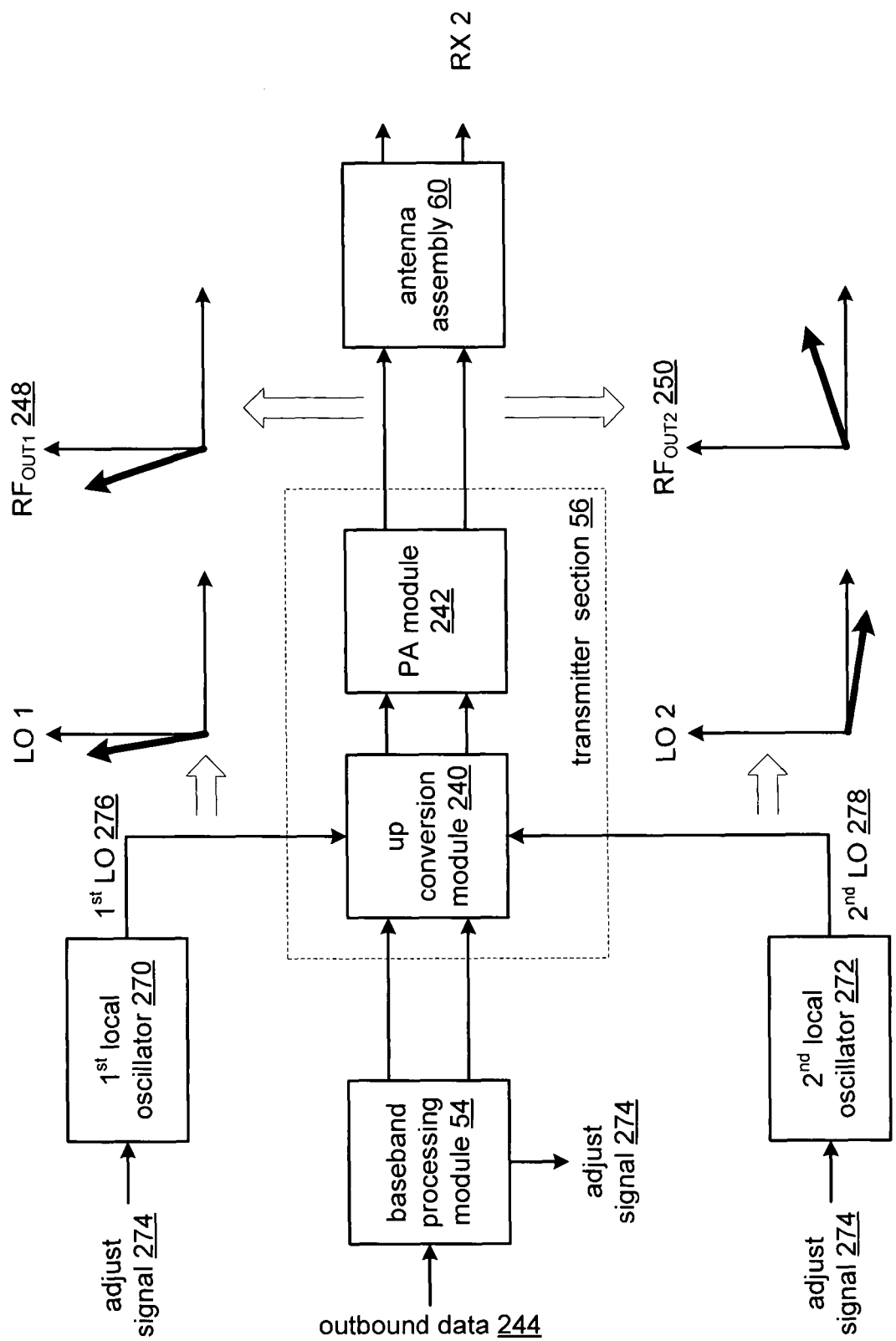
FIG. 21 is a schematic block diagram of another embodiment of an RF transmitter in accordance with the present invention.

FIG. 21 is a schematic block diagram of another embodiment of an RF transmitter that includes the baseband processing module 54, the transmitter section 56, the antenna assembly, a first local oscillator 270, and a second local oscillator 272. The transmitter section 56 includes the up-conversion module 240 and the power amplifier module 242.

In operation, the baseband processing module 54 converts the outbound data 244 into a first outbound symbol stream and a second outbound symbol stream. The baseband processing module 54 also generates the adjust signal 274. In an embodiment, the baseband processing module 54 converts first outbound data of the outbound data 244 into the first outbound symbol stream and converts second outbound data of the outbound data 244 into the second outbound symbol stream. As such, the baseband processing module 54 may generate two or more streams of symbols from the outbound data (e.g., for a MIMO communication, for a baseband beamforming operation, for in-air beamforming, for polarization, etc.) and/or generate two or more streams of symbols from two or more outbound data signals (e.g., multi-mode communications, multi-band communications, etc.).

The up conversion module 240 processes the first outbound symbol stream, a first local oscillation 276, and a first phase adjust component of the adjust signal 274 to produce a phase adjusted first up converted signal. The up conversion module 240 also processes the second outbound symbol stream, a second local oscillation 278, and a second phase adjust component of the adjust signal 274 to produce a phase adjusted second up converted signal. Various embodiments of the up conversion module 240 will be subsequently discussed with reference to FIGS. 22-24.

In addition, the up-conversion module 240 adjusts the amplitude of the phase adjusted first up converted signal and/or the phase adjusted second up converted signal based on the adjust signal 274 to produce an adjusted first up converted signal and an adjusted second up converted signal. The power amplifier module 242 amplifies the adjusted first and second up converted signals to produce first and second outbound RF signals 248 and 250, which are transmitted via the antenna assembly 60.

Figure 22:
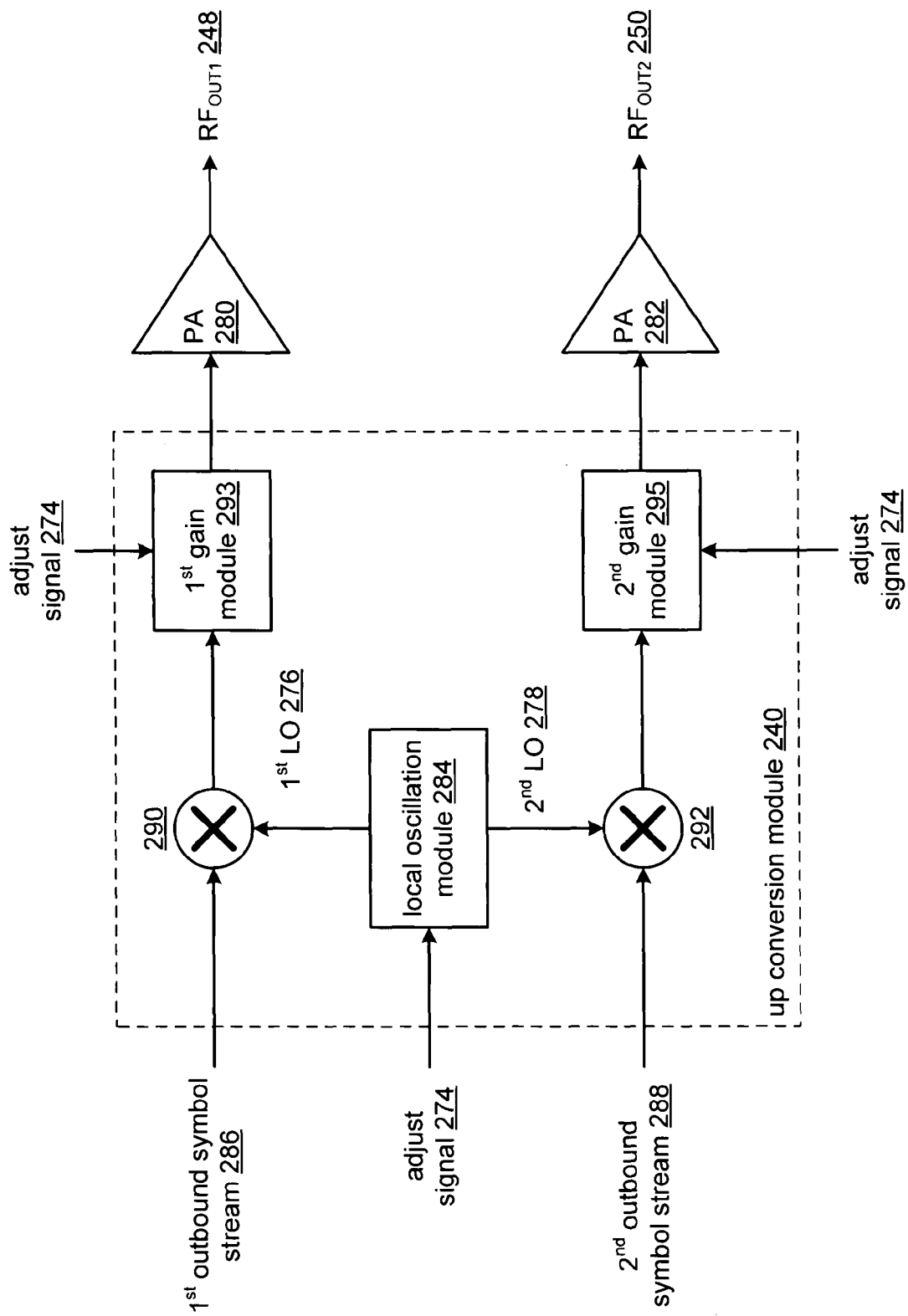
FIG. 22 is a schematic block diagram of an embodiment of an up-conversion module in accordance with the present invention.

FIG. 22 is a schematic block diagram of an embodiment of an up-conversion module 240 that includes a local oscillation module 284, first and second mixing modules 290 and 290, and first and second gain modules 293 and 295. The local oscillation module 284, which may include a crystal oscillator, phase locked loop, fractional-N synthesizer, a direct digital frequency synthesizer, a counter, a frequency multiplier, and/or a frequency divider, generates the first and second local oscillations and then adjusts them in accordance with the adjust signal 274 to produce a phase adjusted first local oscillation 276 and a phase adjusted second local oscillation 278. In an embodiment, a phase offset corresponding to the adjust signal 274 is fed into the feedback loop of an oscillation circuit to provide the phase adjusted first and second local oscillations 276 and 278.

The first mixing module 290, which may include one or more mixers, mixes the phase adjusted first local oscillation 276 with the first outbound symbol stream 286 to produce the phase adjusted first up converted signal. The first gain module 293, which may be a programmable gain amplifier, an amplifier, etc., adjusts the amplitude of the phase adjusted first up converted signal based on the adjust signal 274 to produce the adjusted first up converted signal. A first power amplifier 280 amplifies the adjusted first up converted signal to produce the first outbound RF signal 248.

The second mixing module 292, which may include one or more mixers, mixes the phase adjusted second local oscillation 278 with the second outbound symbol stream 288 to produce the phase adjusted second up converted signal. The second gain module 295, which may be a programmable gain amplifier, an amplifier, etc., adjusts the amplitude of the phase adjusted second up converted signal based on the adjust signal 274 to produce the adjusted second up converted signal. A second power amplifier 282 amplifies the adjusted second up converted signal to produce the second outbound RF signal 250.

Figure 23:
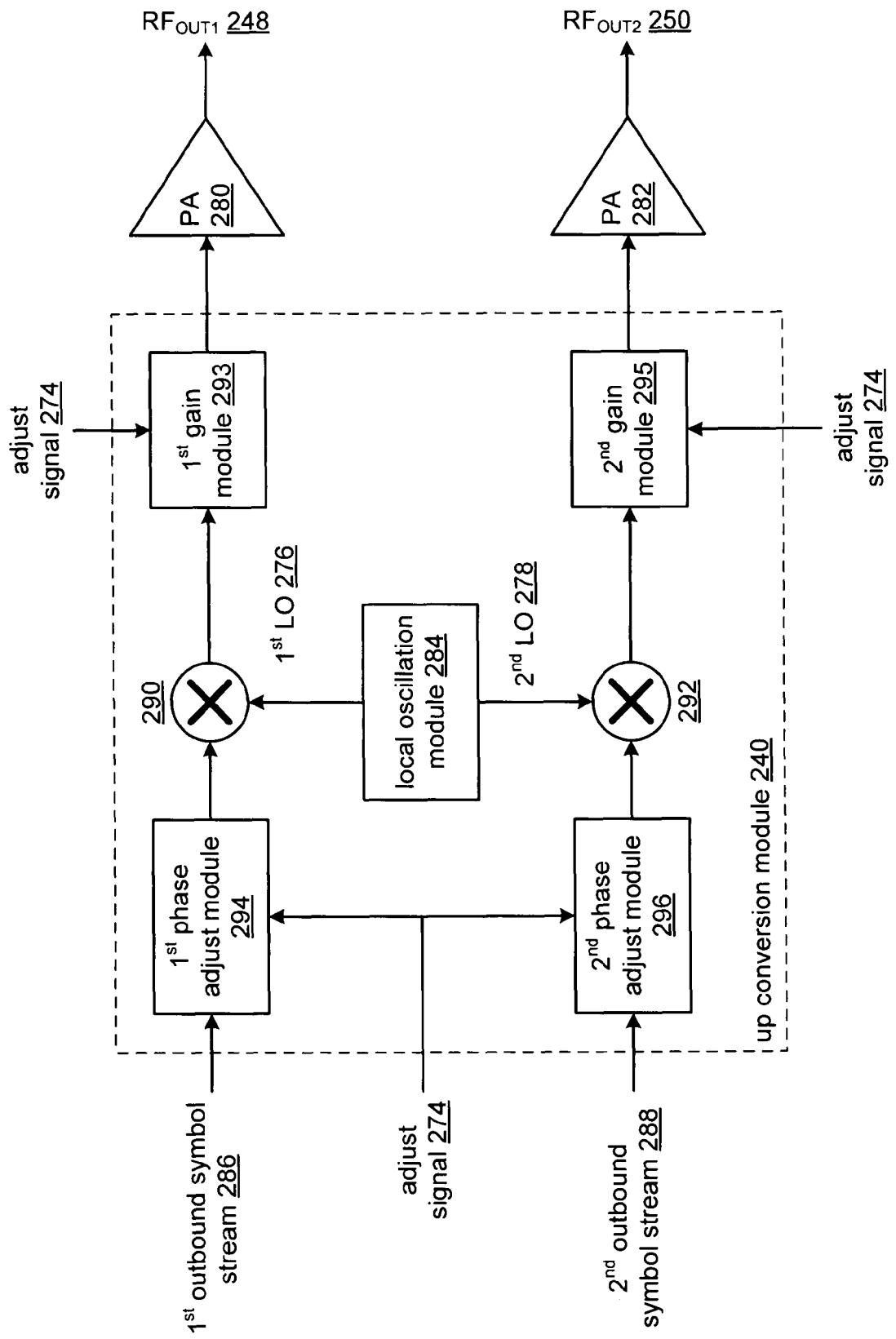
FIG. 23 is a schematic block diagram of another embodiment of an up-conversion module in accordance with the present invention.

FIG. 23 is a schematic block diagram of another embodiment of the up conversion module 240 that includes the first and second mixing modules 290 and 292, the first and second gain modules 293 and 295, first and second phase adjust modules 294 and 296, and a local oscillation module 284. The local oscillation module 284, which may include a crystal oscillator, phase locked loop, fractional-N synthesizer, a direct digital frequency synthesizer, a counter, a frequency multiplier, and/or a frequency divider, generates the first and second local oscillations 276 and 278.

The first phase adjust module 294 adjusts phase of the first outbound symbol stream 286 in accordance with the adjust signal 274 to produce a phase adjusted first outbound symbol stream. In one embodiment, the first phase adjust module 294 is an adjustable delay that delays the first outbound symbol stream 286 by a time duration corresponding to a fraction of a cycle of the symbol stream 286. In another embodiment, the first phase adjust module 294 is a mixer that mixes the first outbound symbol stream 286 with a sinusoidal signal having the desired phase offset. In another embodiment, the first phase adjust module 294 may rotate a polar representation of the first outbound symbol stream 286 to produce the phase adjusted first outbound symbol stream.

The first mixing module 290 mixes the first local oscillation 276 with the phase adjusted first outbound symbol stream to produce the phase adjusted first up converted signal. The first gain module 293 adjusts the amplitude of the phase adjusted first up converted signal based on the adjust signal 274 to produce the adjusted first up converted signal. A first power amplifier 280 amplifies the adjusted first up converted signal to produce the first outbound RF signal 248.

The second phase adjust module 296, which may be implemented similarly to the first phase adjust module 294, adjusts phase of the second inbound symbol stream 288 in accordance with the adjust signal 274 to produce a phase adjusted second outbound symbol stream. The second mixing module 292 mixes the second local oscillation 278 with the phase adjusted second outbound symbol stream to produce the phase adjusted second up converted signal. The second gain module 295 adjusts the amplitude of the phase adjusted second up converted signal based on the adjust signal 274 to produce the adjusted second up converted signal. A second power amplifier 282 amplifies the adjusted second up converted signal to produce the second outbound RF signal 250.

Figure 24:
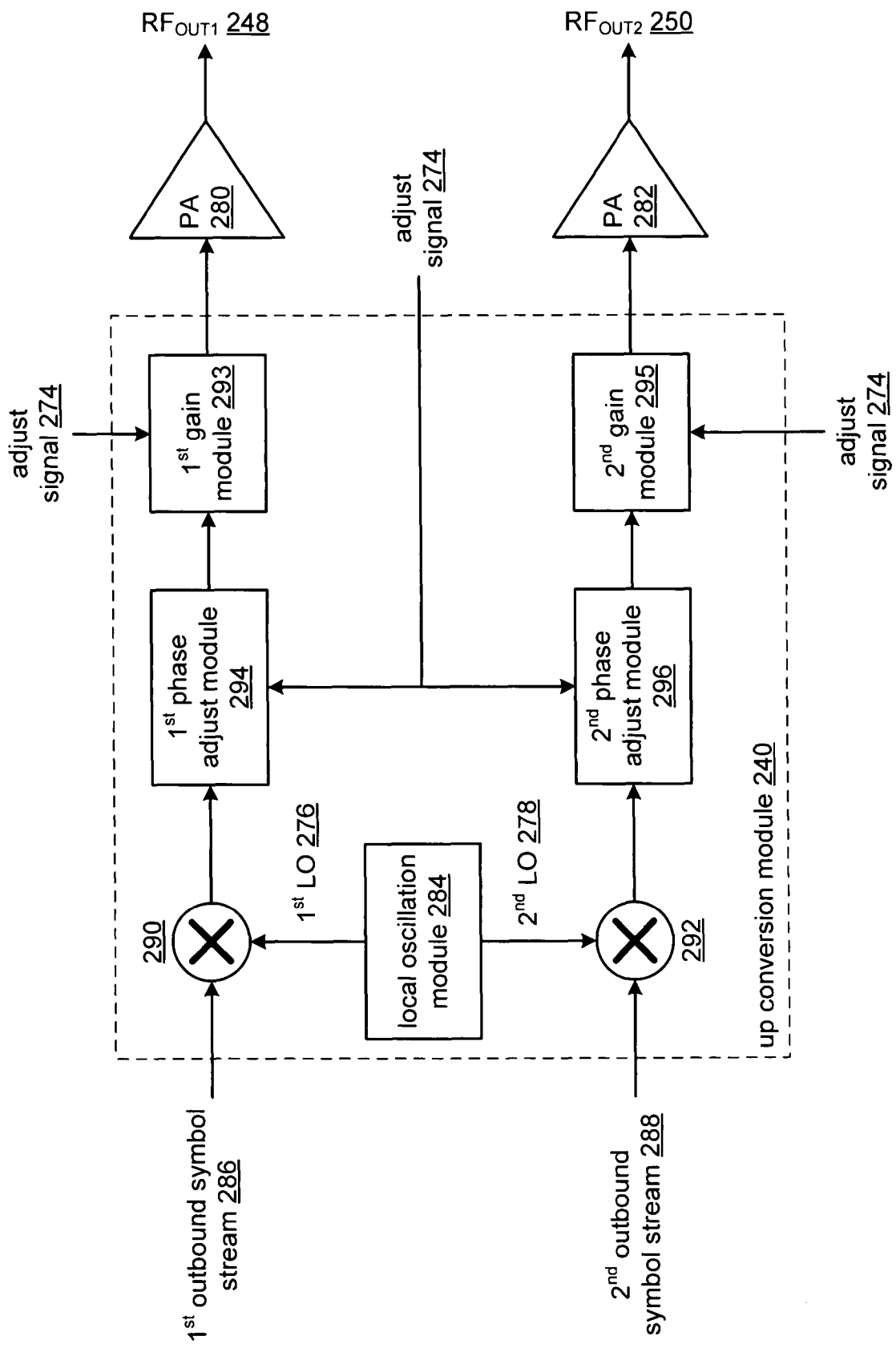
FIG. 24 is a schematic block diagram of another embodiment of an up-conversion module in accordance with the present invention.

FIG. 24 is a schematic block diagram of another embodiment of the up-conversion module 240 that includes the first and second mixing modules 290 and 292, the first and second gain modules 293 and 295, first and second phase adjust modules 294 and 296, and a local oscillation module 284. The local oscillation module 284, which may include a crystal oscillator, phase locked loop, fractional-N synthesizer, a direct digital frequency synthesizer, a counter, a frequency multiplier, and/or a frequency divider, generates the first and second local oscillations 276 and 278.

The first mixing module 290 mixes the first local oscillation 276 with the first outbound symbol stream 286 to produce a mixed first signal. The first phase adjust module 294 adjusts phase of the mixed first signal in accordance with the adjust signal 274 to produce a phase adjusted first up converted signal. The first gain module 293 adjusts the amplitude of the phase adjusted first up converted signal based on the adjust signal 274 to produce the adjusted first up converted signal. A first power amplifier 280 amplifies the adjusted first up converted signal to produce the first outbound RF signal 248.

The second mixing module 292 mixes the second local oscillation 278 with the second outbound symbol stream 288 to produce a mixed second signal. The second phase adjust module 296 adjusts phase of the mixed second signal in accordance with the adjust signal 274 to produce a phase adjusted second up converted signal. The second gain module 295 adjusts the amplitude of the phase adjusted second up converted signal based on the adjust signal 274 to produce the adjusted second up converted signal. A second power amplifier 282 amplifies the adjusted second up converted signal to produce the second outbound RF signal 250.

Figure 25:
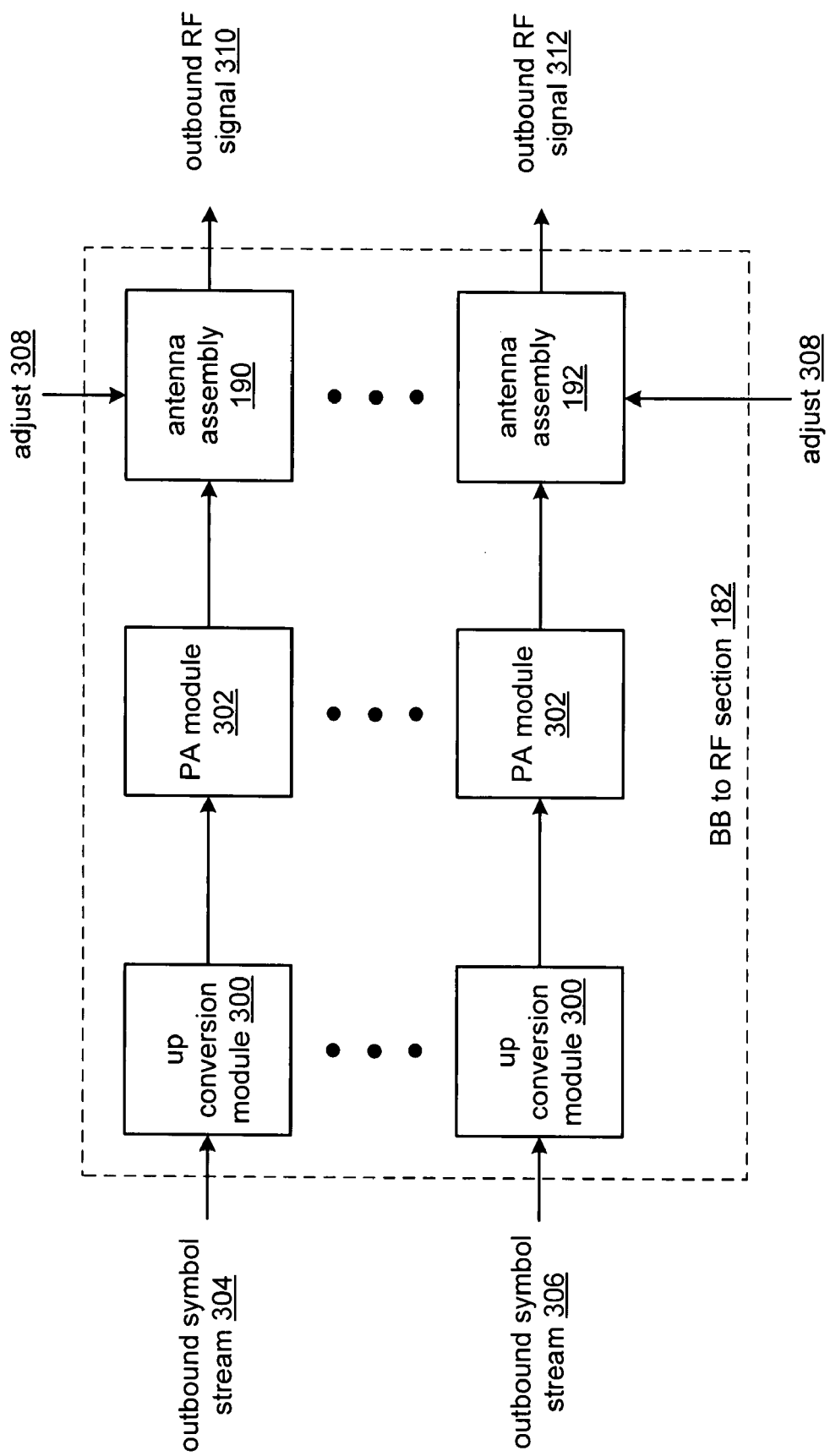
FIG. 25 is a schematic block diagram of an embodiment of a baseband to RF section in accordance with the present invention.

FIG. 25 is a schematic block diagram of an embodiment of a baseband to RF section 182 that includes a plurality of up conversion modules 300, a plurality of power amplifier modules 302, and a plurality of antenna assemblies 190-192.

The plurality of up conversion modules 300, each of which may be implement in a similar manner as up conversion module 240, converts the plurality of outbound symbol streams 304-306 into a plurality of up converted signals. The plurality of power amplifier modules 302, each of which may be implemented in a similar manner to power conversion module 242, amplifies the plurality of up converted signals to produce the plurality of outbound RF signals 310-312. The plurality of configurable antenna assemblies 190-192, each of which may be implemented in a similar manner as antenna assembly 60, transmits the plurality of outbound RF signals 310-312, wherein an antenna characteristic of at least one of the plurality of configurable antenna assemblies is adjusted in accordance with the adjust signal.

Figure 26:
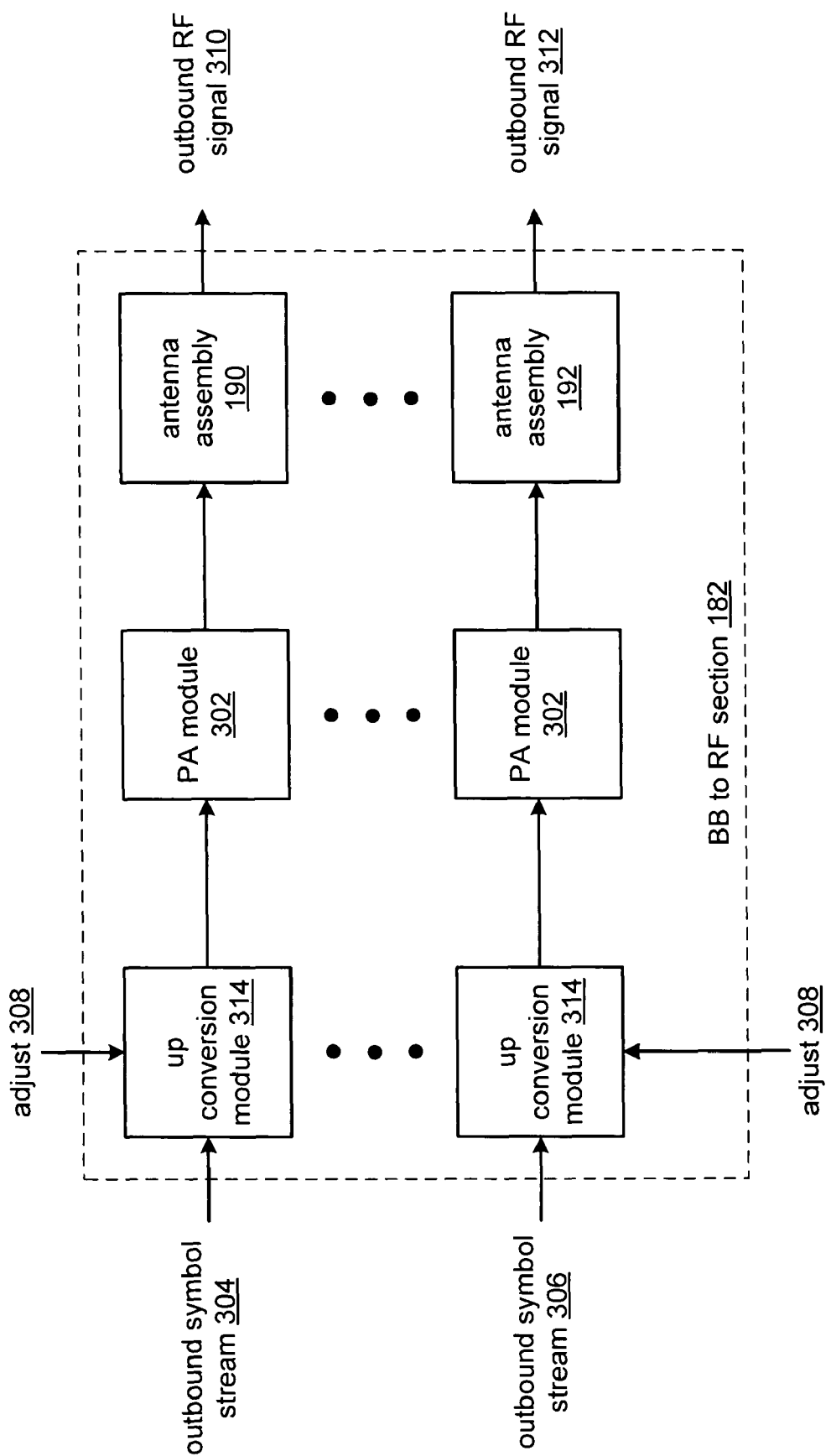
FIG. 26 is a schematic block diagram of another embodiment of a baseband to RF section in accordance with the present invention.

FIG. 26 is a schematic block diagram of another embodiment of a baseband to RF section 182 that includes a plurality of up conversion modules 314, a plurality of power amplifier modules 302, and a plurality of antenna assemblies 190-192.

The plurality of up conversion modules 314, each of which may be implement in a similar manner as up conversion module 240, converts the plurality of outbound symbol streams 304-306 into a plurality of up converted signals, wherein an up conversion characteristic of at least one of the plurality of up conversion modules is adjusted in accordance with the adjust signal 274. The up conversion characteristics include one or more of LO phase, LO amplitude, resulting mixed signal phase, resulting mixed signal amplitude, adjust phase or amplitude of signal components prior to mixing with LO.

The plurality of power amplifier modules 302, each of which may be implemented in a similar manner to power conversion module 242, amplifies the plurality of up converted signals to produce the plurality of outbound RF signals 310-312. The plurality of configurable antenna assemblies 190-192, each of which may be implemented in a similar manner as antenna assembly 60, transmits the plurality of outbound RF signals 310-312, wherein an antenna characteristic of at least one of the plurality of configurable antenna assemblies is adjusted in accordance with the adjust signal.

In another embodiment, an RF transceiver 50 or 52 includes a baseband processing module 54, a configurable receiver section 56, a configurable transmitter section 58, a configurable antenna assembly 60. When the RF transceiver is in a first mode, the baseband processing module 54 converts outbound data into an outbound symbol stream, generates a transmit adjust signal, and generates a receive adjust signal. Note that the transmit adjust signal and/or the receive adjust signal may be generated on a packet by packet basis, a frame by frame basis, and/or a communication by communication basis.

The configurable transmitter section 58 converts the outbound symbol stream into an outbound RF signal. The configurable antenna assembly 60 provides a second antenna structure to transmit the outbound RF signal. The configurable transmitter section 58 and/or the second antenna structure adjust phase and/or amplitude of the outbound RF signal in accordance with the transmit adjust signal.

The configurable antenna assembly 60 also provides a first antenna structure to receive the inbound RF signal, which it provides the configurable receiver section 56. The first antenna structure and/or the configurable receiver section 56 adjusts phase and/or amplitude of the inbound RF signal in accordance with the receive adjust signal to produce an adjusted inbound RF signal.

The configurable receiver section 56 converts the adjusted inbound RF signal into an inbound symbol stream. The baseband processing module 54 converts the inbound symbol stream into inbound data in accordance with one or more of the wireless communication protocols.

In a training mode, the baseband processing module 54 converts an outbound training signal into an outbound training symbol stream. The configurable transmitter section 58 converts the outbound training symbol stream into an outbound RF training signal. The configurable receiver section 56 converts an inbound RF feedback signal into inbound feedback symbol stream. The baseband processing module 54 converts the inbound feedback symbol stream into training signal feedback and generates the transmit adjust signal and the receive adjust signal in accordance with the training signal feedback.

In another training mode, the configurable receiver section 56 converts an inbound RF training signal into an inbound training symbol stream. The baseband processing module 54 converts the inbound training symbol stream into an inbound training signal, compares signal properties of the inbound training signal with expected signal properties, and when the signal properties of the inbound training signal compare unfavorably with the expected signal properties, generate the transmit adjust signal and the receive adjust signal in accordance with the unfavorable comparison.

In another embodiment of the RF transceiver, the baseband processing module 54 converts the outbound data into a first outbound symbol stream and a second outbound symbol stream. The configurable transmitter section 58 converts the first outbound symbol stream into a first outbound RF signal and converts the second outbound symbol stream into a second outbound RF signal.

The configurable antenna assembly 60 transmits the first outbound RF signal via the second antenna structure and transmits the second outbound RF signal via a fourth antenna structure. The second and fourth antenna structures are configured in accordance with the transmit adjust signal to adjust phase and/or amplitude of the first and/or second outbound RF signals. Alternatively, the configurable transmitter section 58 is configured in accordance with the transmit adjust signal to adjust the phase and/or amplitude of the first and/or second outbound RF signals.

The configurable antenna assembly 60 also receives a first representation of the inbound RF signal via the first antenna structure and receives a second representation of the inbound RF signal via a third antenna structure. The first and third antenna structures are configured in accordance with the receive adjust signal to adjust phase and/or amplitude of the first and/or second representations of the inbound RF signal. Alternatively, the configurable receiver section 56 is configured in accordance with the receive adjust signal to adjust the phase and/or amplitude of the first and/or second representations of the inbound RF signal.

The configurable receiver section 56 converts a first representation of the inbound RF signal into the first inbound symbol stream and converts a second representation of the inbound RF signal into the second inbound symbol stream. The baseband processing module 54 converts the first inbound symbol stream and the second inbound symbol stream into the inbound data.

The baseband processing module 54 may generate the transmit and receive adjust signals in a variety of ways. For instances, the baseband processing module may determine first and second components of the transmit adjust signal, where the first component is for the first antenna structure and the second component is for the third antenna structure such that the first and second outbound RF signals have a desired phase relationship between them. In addition, the baseband processing module may determine first and second components of the receive adjust signal, where the first component is for the second antenna structure and the second component is for the fourth antenna structure such that the first and second representations of the inbound RF signal have a desired phase relationship between them.

As another example of generating the adjust signals, the baseband processing module 54 generates a plurality of receive adjust signals. For each of the plurality of receive adjust signals, the baseband processing module 54 determines a receive signal strength indication of the inbound RF signal to produce a plurality of received signal strengths. The baseband processing module then provides one of the plurality of receive adjust signals that corresponds to a desired one of the plurality of received signal strengths as the receive adjust signal. For instance, the receive adjust signal setting have the highest received signal strength may be selected as the receive adjust signal.

In another embodiment of the RF transceiver, the baseband processing module 54 converts first outbound data of the outbound data into a first outbound symbol stream and converts second outbound data of the outbound data into a second outbound symbol stream. The configurable transmitter section 58 converts the first outbound symbol stream into a first outbound RF signal and converts the second outbound symbol stream into a second outbound RF signal.

The configurable antenna assembly 60 transmits the first outbound RF signal via the second antenna structure and transmits the second outbound RF signal via a fourth antenna structure. The second and fourth antenna structures are configured in accordance with the transmit adjust signal to adjust phase and/or amplitude of the first and/or second outbound RF signals. Alternatively, the configurable transmitter section 58 is configured in accordance with the transmit adjust signal to adjust the phase and/or amplitude of the first and/or second outbound RF signals.

The configurable antenna assembly 60 also receives a first representation of the inbound RF signal via the first antenna structure and receives a second representation of the inbound RF signal via a third antenna structure. The first and third antenna structures are configured in accordance with the receive adjust signal to adjust phase and/or amplitude of the first and/or second representations of the inbound RF signal. Alternatively, the configurable receiver section 56 is configured in accordance with the receive adjust signal to adjust the phase and/or amplitude of the first and/or second representations of the inbound RF signal.

The configurable receiver section 56 converts the first representation of the inbound RF signal into the first inbound symbol stream and converts the second representation of the inbound RF signal into the second inbound symbol stream. The baseband processing module 54 converts the first inbound symbol stream into first inbound data of the inbound data and converts the second inbound symbol stream into second inbound data of the inbound data.

In this embodiment, the baseband processing module 54 may generate the adjust signals by determining first and second components of the transmit adjust signal based on an orthogonal relationship between the first and second outbound RF signals. In addition, the baseband processing module 54 determines first and second components of the receive adjust signal based on an orthogonal relationship between the first and second representations of the inbound RF signal and based on a desired phase relationship between the inbound RF signal and a combination of the first and second outbound RF signals.

When the RF transceiver is in a second mode it primarily functions as an RF receiver as discussed with reference to FIGS. 4, 7, 8, 14, and/or 15. When the RF transceiver is in a third mode it primarily functions as an RF transmitter as discussed with reference to FIGS. 18, 21, 25, and/or 26.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e.; where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) transceiver comprises:
a baseband processing module;
a configurable receiver section;
a configurable transmitter section; and
a configurable antenna assembly, wherein, when the RF transceiver is in a first mode:
the baseband processing module is coupled to:
convert outbound data into an outbound symbol stream;
convert an inbound symbol stream into inbound data;
generate a transmit adjust signal; and
generate a receive adjust signal;
the configurable receiver section is coupled to convert an inbound RF signal into the inbound symbol stream;
the configurable transmitter section is coupled to convert the outbound symbol stream into an outbound RF signal; and
the configurable antenna assembly is coupled to receive the inbound RF signal via a first antenna structure and to transmit the outbound RF signal via a second antenna structure, wherein at least one of the first antenna structure and the configurable receiver section adjusts at least one of phase and amplitude of the inbound RF signal in accordance with the receive adjust signal, and wherein at least one of the second antenna structure and the configurable transmitter section adjusts at least one of phase and amplitude of the outbound RF signal in accordance with the transmit adjust signal.

2. The RF transceiver of claim 1 comprises:
the baseband processing module coupled to convert outbound training signal into an outbound training symbol stream;
the configurable transmitter section coupled to convert the outbound training symbol stream into an outbound RF training signal;
the configurable receiver section coupled to convert an inbound RF feedback signal into inbound feedback symbol stream; and
the baseband processing module coupled to:
convert the inbound feedback symbol stream into training signal feedback; and
generate the transmit adjust signal and the receive adjust signal in accordance with the training signal feedback.

3. The RF transceiver of claim 1 comprises:
the configurable receiver section coupled to convert an inbound RF training signal into an inbound training symbol stream; and
the baseband processing module coupled to:
convert the inbound training symbol stream into an inbound training signal;
compare signal properties of the inbound training signal with expected signal properties; and
when the signal properties of the inbound training signal compare unfavorably with the expected signal properties, generate the transmit adjust signal and the receive adjust signal in accordance with the unfavorable comparison.

4. The RF transceiver of claim 1 comprises:
the baseband processing module is coupled to:
convert the outbound data into a first outbound symbol stream and a second outbound symbol stream; and
convert a first inbound symbol stream and a second inbound symbol stream into the inbound data;
the configurable receiver section is coupled to convert a first representation of the inbound RF signal into the first inbound symbol stream and to convert a second representation of the inbound RF signal into the second inbound symbol stream;
the configurable transmitter section is coupled to convert the first outbound symbol stream into a first outbound RF signal and to convert the second outbound symbol stream into a second outbound RF signal; and
the configurable antenna assembly is coupled to receive the first representation of the inbound RF signal via the first antenna structure, receive the second representation of the inbound RF signal via a third antenna structure, transmit the first outbound RF signal via the second antenna structure, and transmit the second outbound RF signal via a fourth antenna structure, wherein the first and third antenna structures are configured in accordance with the receive adjust signal to adjust at least one of phase and amplitude of at least one of the first and second representations of the inbound RF signal, and wherein the second and fourth antenna structures are configured in accordance with the transmit adjust signal to adjust at least one of phase and amplitude of at least one of the first and second outbound RF signals.

5. The RF transceiver of claim 4, wherein the baseband processing module is further coupled to:
   determine a first component of the transmit adjust signal;
   determine a second component of the transmit adjust signal, wherein the determining of the first and second components of the transmit adjust signal is based on a desired phase relationship between the first and second outbound RF signals;
   determine a first component of the receive adjust signal; and
   determine a second component of the receive adjust signal, wherein the determining of the first and second components of the receive adjust signal is based on a desired phase relationship between the first and second representations of the inbound RF signal and based on a desired phase relationship between the inbound RF signal and a combination of the first and second outbound RF signals.

6. The RF transceiver of claim 4, wherein the baseband processing module is further coupled to:
   generate a plurality of receive adjust signals;
   for each of the plurality of receive adjust signals, determine receive signal strength of the inbound RF signal to produce a plurality of received signal strengths; and
   provide a corresponding one of the plurality of receive adjust signals that corresponds to a desired one of the plurality of received signal strengths as the receive adjust signal.

7. The RF transceiver of claim 1 comprises:
   the baseband processing module is coupled to:
      convert first outbound data of the outbound data into a first outbound symbol stream;
      convert second outbound data of the outbound data into a second outbound symbol stream;
      convert a first inbound symbol stream into first inbound data of the inbound data; and
      convert a second inbound symbol stream into second inbound data of the inbound data;
   the configurable receiver section is coupled to convert a first representation of the inbound RF signal into the first inbound symbol stream and to convert a second representation of the inbound RF signal into the second inbound symbol stream;
   the configurable transmitter section is coupled to convert the first outbound symbol stream into a first outbound RF signal and to convert the second outbound symbol stream into a second outbound RF signal; and
   the configurable antenna assembly is coupled to receive the first representation of the inbound RF signal via the first antenna structure, receive the second representation of the inbound RF signal via a third antenna structure, transmit the first outbound RF signal via the second antenna structure, and transmit the second outbound RF signal via a fourth antenna structure, wherein the first and third antenna structures are configured in accordance with the receive adjust signal to adjust at least one of phase and amplitude of at least one of the first and second representations of the inbound RF signal, and wherein the second and fourth antenna structures are configured in accordance with the transmit adjust signal to adjust at least one of phase and amplitude of at least one of the first and second outbound RF signals.

8. The RF transceiver of claim 7, wherein the baseband processing module is further coupled to:
   determine a first component of the transmit adjust signal;
   determine a second component of the transmit adjust signal, wherein the determining of the first and second components of the transmit adjust signal is based on an orthogonal relationship between the first and second outbound RF signals;
   determine a first component of the receive adjust signal; and
   determine a second component of the receive adjust signal, wherein the determining of the first and second components of the receive adjust signal is based on an orthogonal relationship between the first and second representations of the inbound RF signal and based on a desired phase relationship between the inbound RF signal and a combination of the first and second outbound RF signals.

9. The RF transceiver of claim 1 further comprises, when the RF transceiver is in a second mode:
   the baseband processing module is coupled to:
      convert the inbound symbol stream into the inbound data; and
      generate the receive adjust signal;
   the configurable receiver section is coupled to convert a first representation of the inbound RF signal and a second representation of the inbound RF signal into the inbound symbol stream; and
   the configurable antenna assembly is coupled to receive first representation of the inbound RF signal via the first antenna structure and to receive the second representation of the inbound RF signal via the second antenna structure, wherein the first and second antenna structures are configured in accordance with the receive adjust signal to adjust at least one of phase and amplitude of at least one of the first and second representations of the inbound RF signal.

10. The RF transceiver of claim 1 further comprises, when the RF transceiver is in a third mode:
   the baseband processing module is coupled to:
      convert the outbound data into a first outbound symbol stream and a second outbound symbol stream; and
      generate the transmit adjust signal;
   the configurable transmitter section is coupled to convert the first outbound symbol stream into a first outbound RF signal and to convert the second outbound symbol stream into a second outbound RF signal; and
   the configurable antenna assembly is coupled to transmit the first outbound RF signal via a first antenna structure and to transmit the second outbound RF signal via a second antenna structure, wherein the first and second antenna structures are configured in accordance with the transmit adjust signal to adjust at least one of phase and amplitude of at least one of the first and second outbound RF signals.

11. The RF transceiver of claim 1 further comprises, when the RF transceiver is in a second mode:
   the baseband processing module is coupled to:
      convert a first inbound symbol stream into first inbound data;
      convert a second inbound symbol stream into second inbound data; and
      generate the receive adjust signal;

the configurable receiver section is coupled to convert a first inbound RF signal into the first inbound symbol stream and to convert a second inbound RF signal into the second inbound symbol stream; and the configurable antenna assembly is coupled to receive the first inbound RF signal via the first antenna structure and to receive the second inbound RF signal via the second antenna structure, wherein the first and second antenna structures are configured in accordance with the receive adjust signal to adjust at least one of phase and amplitude of at least one of the first and second inbound RF signals.

12. The RF transceiver of claim 11 further comprises at least one of:
   the first and second inbound RF signals having a carrier frequency within a same frequency band; and
   the first inbound RF signal having a carrier frequency within a first frequency band and the second inbound RF signal having a carrier frequency within a second frequency band.

13. The RF transceiver of claim 1 further comprises, when the RF transceiver is in a third mode:
   the baseband processing module is coupled to:
      convert first outbound data into a first outbound symbol stream;
      convert second outbound data into a second outbound symbol stream; and
      generate the transmit adjust signal;
   the configurable transmitter section is coupled to convert the first outbound symbol stream into a first outbound RF signal and to convert the second outbound symbol stream into a second outbound RF signal; and
   the configurable antenna assembly is coupled to transmit the first outbound RF signal via a first antenna structure and to transmit the second outbound RF signal via a second antenna structure, wherein the first and second antenna structures are configured in accordance with the transmit adjust signal to adjust at least one of phase and amplitude of at least one of the first and second outbound RF signals.

14. The RF transceiver of claim 13 further comprises at least one of:
   the first and second outbound RF signals having a carrier frequency within a same frequency band; and
   the first outbound RF signal having a carrier frequency within a first frequency band and the second outbound RF signal having a carrier frequency within a second frequency band.

15. A configurable antenna assembly comprises:
   a configurable antenna structure operable, in a first mode, to provide a first antenna structure and a second antenna structure, wherein the first antenna structure receives an inbound radio frequency (RF) signal and the second antenna structure transmits an outbound RF signal, wherein the first antenna structure is configured in accordance with a receive adjust signal to adjust at least one of phase and amplitude of the inbound RF signal, and wherein the second antenna structure is configured in accordance with a transmit adjust signal to adjust at least one of phase and amplitude of the outbound RF signal; and
   an antenna interface coupled to the configurable antenna structure and to an RF transceiver front-end.

16. The configurable antenna assembly of claim 15, wherein the configurable antenna structure is operable, in another mode, to provide:
   a third antenna structure to receive a second representation of the inbound RF signal, wherein the first antenna structure receives a first representation of the inbound RF signal; and
   a fourth antenna structure to transmit a second outbound RF signal, wherein the second antenna structure transmits a first outbound RF signal.

17. The configurable antenna assembly of claim 15 comprises:
   the configurable antenna structure operable, in a second mode, to provide a first receive antenna structure and a second receive antenna structure, wherein the first receive antenna structure receives a first representation of the inbound RF signal and the second receive antenna structure receives a second representation of the inbound RF signal, wherein the first and second receive antenna structures are configured in accordance with the receive adjust signal to adjust at least one of phase and amplitude of at least one of the first and second representations of the inbound RF signal.

18. The configurable antenna assembly of claim 15 comprises:
   the configurable antenna structure operable, in a third mode, to provide a first transmit antenna structure and a second transmit antenna structure, wherein the first transmit antenna structure transmits a first outbound RF signal and the second transmit antenna structure transmits a second outbound RF signal, wherein the first and second transmit antenna structures are configured in accordance with the transmit adjust signal to adjust at least one of phase and amplitude of at least one of the first and second outbound RF signals.

* * * * *